US011601916B2

(12) United States Patent
Gulati et al.

(10) Patent No.: US 11,601,916 B2
(45) Date of Patent: Mar. 7, 2023

(54) SIDELINK CANDIDATE RESOURCE SELECTION

(71) Applicant: QUALCOMM Incorporated, San Diego, CA (US)

(72) Inventors: Kapil Gulati, Belle Mead, NJ (US); Tien Viet Nguyen, Bridgewater, NJ (US); Gabi Sarkis, San Diego, CA (US); Sudhir Kumar Baghel, Hillsborough, NJ (US)

(73) Assignee: Qualcomm Incorporated, San Diego, CA (US)

( * ) Notice: Subject to any disclaimer, the term of this patent is extended or adjusted under 35 U.S.C. 154(b) by 198 days.

(21) Appl. No.: 17/090,068

(22) Filed: Nov. 5, 2020

(65) Prior Publication Data

US 2021/0144681 A1    May 13, 2021

Related U.S. Application Data

(60) Provisional application No. 62/933,239, filed on Nov. 8, 2019.

(51) Int. Cl.
  *H04W 72/02* (2009.01)
  *H04W 24/08* (2009.01)
  (Continued)

(52) U.S. Cl.
  CPC .......... *H04W 72/02* (2013.01); *H04B 17/318* (2015.01); *H04W 24/08* (2013.01); *H04W 72/1242* (2013.01); *H04W 92/18* (2013.01)

(58) Field of Classification Search
  CPC ..... H04W 72/02; H04W 72/124; H04W 4/70; H04W 24/08; H04W 92/18; H04B 17/318
  See application file for complete search history.

(56) References Cited

U.S. PATENT DOCUMENTS

2019/0132818 A1   5/2019 Yasukawa et al.
2020/0374861 A1*  11/2020 Shilov .................. H04L 5/0053
(Continued)

FOREIGN PATENT DOCUMENTS

WO    WO-2018031086 A1    2/2018

OTHER PUBLICATIONS

FutureWei: "Views on Mode-2 Resource Allocation", 3GPP TSG RAN WG1 Meeting #98bis, 3GPP Draft; R1-1910698, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 4, 2019 (Oct. 4, 2019), 7 Pages, XP051808256, Retrieved from the Internet: URL: https://ftp.3gpp.org/tsg_ran/WG1_RL1/TSGR1_98b/Docs/R1-1910698.zip R1-1910698.docx [retrieved on Oct. 4, 2019] Chapters 1,2.

(Continued)

*Primary Examiner* — Jamal Javaid
*Assistant Examiner* — Ryan C Kavleski
(74) *Attorney, Agent, or Firm* — Holland & Hart LLP

(57) ABSTRACT

Methods, systems, and devices for wireless communications are described. A user equipment (UE) may measure the reference signal received power (RSRP) of reference signals from other UEs in a time window and exclude resources of transmissions with a measurement which is above RSRP threshold. In some cases, not enough resources are identified, and the UE may increase the RSRP and search for resources again, however the UE may only increase the RSRP until a stop RSRP limit is reached. The UE may increase the RSRP based on an absolute value or a factor of an incremental power value. Once the stop RSRP threshold is reached, the UE may modify the size of the time window, shift the time window, or reduce the number of retransmis- (Continued)

sion of the sidelink message to search for resources for the sidelink message.

29 Claims, 16 Drawing Sheets

(51) Int. Cl.
*H04W 72/12* (2023.01)
*H04B 17/318* (2015.01)
*H04W 92/18* (2009.01)

(56) References Cited

U.S. PATENT DOCUMENTS

2021/0045089 A1* 2/2021 Yu .................... H04W 72/02
2021/0105104 A1* 4/2021 Cao .................. H04W 72/0413

OTHER PUBLICATIONS

International Search Report and Written Opinion—PCT/US2020/059392—ISA/EPO—dated Apr. 14, 2021.
Mediatek Inc: "On Sidelink Mode-2 Resource Allocation", 3GPP TSG RAN WG1 Meeting #98bis, 3GPP Draft; R1-1911067 On Sidelink Mode 2 Resource Allocation, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, pp. 1-11, Oct. 8, 2019 (Oct. 8, 2019), XP051809269, Retrieved from the Internet: URL: https://ftp.3gpp.org/tsg_ran/WG1_RL1/TSGR1_98b/Docs/R1-1911067.zip R1-1911067 On Sidelink Mode 2 Resource Allocation. docx [retrieved on Oct. 8, 2019] Chapters 1,2.
Panasonic: "Discussion on Sidelink Resource Allocation in Mode 2 for NR V2X", 3GPP TSG RAN WG1 #98bis, 3GPP Draft; R1-1910842, 3rd Generation Partnership Project (3GPP), Mobile Competence Centre, 650, Route Des Lucioles; F-06921 Sophia-Antipolis Cedex; France, vol. RAN WG1, No. Chongqing, China; Oct. 14, 2019-Oct. 20, 2019, Oct. 7, 2019 (Oct. 7, 2019), 7 Pages, XP051808979, Retrieved from the Internet: URL: https://ftp.3gpp.org/tsg_ran/WG1_RL1/TSGR1_98b/Docs/R1-1910842.zip R1-1910842.docx [retrieved on Oct. 7, 2019] Chapters 1,2.
Partial International Search Report—PCT/US2020/059392—ISA/EPO—dated Feb. 24, 2021.
Qualcomm Incorporated: "Sidelink Resource Allocation Mechanism for NR V2X", 3GPP TSG-RAN WG1 #98bis, 3GPP Draft; R1-1911106_Sidelink Resource Allocation Mechanism for NR V2X, 3rd Generation Partnership Project (3GPP), Mobile Competence Centre; 650, Route Des Lucioles; F-06921 Sophia-Antipolis Cedex, vol. RAN WG1, No. Chongqing, China; Oct. 14, 2019-Oct. 20, 2019, Oct. 8, 2019 (Oct. 8, 2019), 10 Pages, XP051809282, Retrieved from the Internet: URL: https://ftp.3gpp.org/tsg_ran/WG1_RL1/TSGR1_98b/Docs/R1-1911106.zip R1-1911106_Sidelink Resource Allocation Mechanism for NR V2X.docx [retrieved on Oct. 8, 2019] Chapters 1-5.

* cited by examiner

SIDELINK CANDIDATE RESOURCE SELECTION

CROSS REFERENCE

The present Application for Patent claims the benefit of U.S. Provisional Patent Application No. 62/933,239 by GULATI et al., entitled "SIDELINK CANDIDATE RESOURCE SELECTION," filed Nov. 8, 2019, assigned to the assignee hereof, and expressly incorporated by reference herein.

FIELD OF TECHNOLOGY

The following relates generally to wireless communications and more specifically to sidelink candidate resource selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with other UEs in a device to device (D2D) system, vehicle to everything (V2X), or other systems over a sidelink communications link. In some cases, such as when UEs are in close proximity to one another, there may be a limited number of available resources available for a UE to perform sidelink transmissions. Conventional sidelink scheduling techniques may not fully address issues that arise from limited resources available for sidelink communications, which may lead to collisions between UE communications, interference, dropped transmissions, or the like.

SUMMARY

The described techniques relate to improved methods, systems, devices, and apparatuses that support sidelink candidate resource selection. Generally, the described techniques enable a user equipment (UE) to communicate with one or more UEs using time-frequency resources over sidelinks selected from a pool of candidate resources. Before sending a transmission over a sidelink, the UE may determine available (e.g., candidate) time resources (e.g., slots, subframes, etc.) and frequency resources (e.g., carriers, channels, resource blocks (RBs), subchannels) by excluding the resources utilized by other UEs. For instance, the UE may determine which resources to exclude by decoding control information (e.g., sidelink control information (SCI)) received from the other UEs (e.g., the UE may monitor time-frequency resources for SCI from one or more neighboring UEs). The UE may also measure one or more signal characteristics (e.g., signal quality, signal power, interference measurement, reference signal received power (RSRP)) of a signal (e.g., a reference signal, control signal, data signal) from a neighboring UE, or may consider location information of the neighboring UEs when determining resources available for sidelink communications.

According to some aspects, the UE may measure the RSRP of a reference signal associated with a control channel received from a neighboring UE within a time window, and may exclude resources indicated by the control channel if the RSRP measurement is above RSRP threshold or within an RSRP threshold range (e.g., within an initial RSRP threshold and a stop RSRP threshold). In some cases, if a limited number of resources are identified as available for sidelink communications, the UE may increase the RSRP threshold (e.g., increase the initial RSRP threshold by an absolute value, a factor of an incremental value) and search for resources again. This may continue until a suitable number of resources are available, though the UE may only increase the RSRP threshold used for resource selection until a stop RSRP limit is reached. Once the stop RSRP threshold is reached, the UE may modify the size of the time window, shift the time window, reduce the number of retransmissions of the sidelink message, or any combination thereof, to search for resources for transmission of the sidelink message. In some examples, a base station may configure the UE with an exclusion range (i.e., resources to be excluded from consideration) or a configuration for increasing the RSRP threshold (e.g., a subset of values which the UE can use for incrementing the RSRP threshold).

A method of wireless communications at a first UE is described. The method may include determining a time window for resource selection for transmission of a sidelink message from the first UE to a second UE, determining a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE, selecting resources for transmission of the sidelink message from the set of candidate resources, and transmitting the sidelink message to the second UE via the selected resources.

An apparatus for wireless communications at a first UE is described. The apparatus may include a processor, memory coupled with the processor, and instructions stored in the memory. The instructions may be executable by the processor to cause the apparatus to determine a time window for resource selection for transmission of a sidelink message from the first UE to a second UE, determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE, select resources for transmission of the sidelink message from the set of candidate resources, and transmit the sidelink message to the second UE via the selected resources.

Another apparatus for wireless communications at a first UE is described. The apparatus may include means for determining a time window for resource selection for transmission of a sidelink message from the first UE to a second UE, determining a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE, selecting resources for transmission of the sidelink message from the set of candidate resources, and transmitting the sidelink message to the second UE via the selected resources.

A non-transitory computer-readable medium storing code for wireless communications at a first UE is described. The code may include instructions executable by a processor to determine a time window for resource selection for transmission of a sidelink message from the first UE to a second UE, determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE, select resources for transmission of the sidelink message from the set of candidate resources, and transmit the sidelink message to the second UE via the selected resources.

Some examples of the method, apparatuses, and non-transitory computer-readable medium described herein may further include operations, features, means, or instructions for determining an RSRP of a reference signal from the at least one neighboring UE, and determining the set of candidate resources based on the RSRP, the initial power threshold, and the stop power threshold.

Some examples of the method, apparatuses, and non-transitory computer-readable medium described herein may further include operations, features, means, or instructions for determining that the RSRP of the reference signal may be above the initial power threshold, increasing a power threshold for determining the set of candidate resources, the power threshold being between the initial power threshold and the stop power threshold, and determining the set of candidate resources based on the RSRP and the power threshold.

Some examples of the method, apparatuses, and non-transitory computer-readable medium described herein may further include operations, features, means, or instructions for increasing the power threshold according to an absolute value, a factor of an incremental value, a number of retransmissions associated with the sidelink message, a priority of the sidelink message, a packet delay budget (PDB) associated with the sidelink message, a priority of scheduled transmission for the at least one neighboring UE, or any combination thereof.

Some examples of the method, apparatuses, and non-transitory computer-readable medium described herein may further include operations, features, means, or instructions for refraining from increasing the power threshold past the stop power threshold.

Some examples of the method, apparatuses, and non-transitory computer-readable medium described herein may further include operations, features, means, or instructions for increasing a size of the time window for selection of resources for transmission of the sidelink message, and determining the set of candidate resources based on the increased size of the time window.

Some examples of the method, apparatuses, and non-transitory computer-readable medium described herein may further include operations, features, means, or instructions for determining that the RSRP may be above the stop power threshold, where the size of the time window may be increased based on the determination that the RSRP may be above the stop power threshold.

Some examples of the method, apparatuses, and non-transitory computer-readable medium described herein may further include operations, features, means, or instructions for shifting the time window from a first start time to a second start time subsequent the first start time, and determining the set of candidate resources based on shifting the time window.

Some examples of the method, apparatuses, and non-transitory computer-readable medium described herein may further include operations, features, means, or instructions for determining that the RSRP may be above the stop power threshold, where the time window may be shifted based on the determination that the RSRP may be above the stop power threshold.

Some examples of the method, apparatuses, and non-transitory computer-readable medium described herein may further include operations, features, means, or instructions for receiving an indication of an exclusion range for resource selection for transmission of the sidelink message, and determining the set of candidate resources based on the exclusion range, where the set of candidate resources excludes resources specified by the exclusion range.

In some examples of the method, apparatuses, and non-transitory computer-readable medium described herein, the indication may be received from a base station via a control channel message.

Some examples of the method, apparatuses, and non-transitory computer-readable medium described herein may further include operations, features, means, or instructions for determining a number of retransmissions associated with the sidelink message, and determining a size of the time window based on the number of retransmissions.

Some examples of the method, apparatuses, and non-transitory computer-readable medium described herein may further include operations, features, means, or instructions for determining that an RSRP of a reference signal from the at least one neighboring UE may be above the initial power threshold, reducing the number of retransmissions associated with the sidelink message, increasing the size of the time window based on reducing the number of retransmissions, and determining the set of candidate resources from the time window based on the increased size.

Some examples of the method, apparatuses, and non-transitory computer-readable medium described herein may further include operations, features, means, or instructions for determining the time window based on a packet delay budget of the sidelink message.

Some examples of the method, apparatuses, and non-transitory computer-readable medium described herein may further include operations, features, means, or instructions for receiving a configuration for increasing a power threshold used for determination of the set of candidate resources, and determining the set of candidate resources based on the configuration.

In some examples of the method, apparatuses, and non-transitory computer-readable medium described herein, the configuration may be received from a base station via a control channel message.

Some examples of the method, apparatuses, and non-transitory computer-readable medium described herein may further include operations, features, means, or instructions for determining that an RSRP of a reference signal from the at least one neighboring UE may be above the initial power threshold, increasing the power threshold used for determination of the set of candidate resources according to the configuration, and determining the set of candidate resources after increasing the power threshold.

A method of wireless communications at a base station is described. The method may include establishing a communication link with a first UE in communication with a second UE via a sidelink communications link, determining a configuration for candidate resource selection for a sidelink message from the first UE to the second UE, the configuration based on an initial power threshold and a stop power threshold, and transmitting an indication of the configuration to the first UE.

An apparatus for wireless communications at a base station is described. The apparatus may include a processor, memory coupled with the processor, and instructions stored in the memory. The instructions may be executable by the processor to cause the apparatus to establish a communication link with a first UE in communication with a second UE via a sidelink communications link, determine a configuration for candidate resource selection for a sidelink message from the first UE to the second UE, the configuration based on an initial power threshold and a stop power threshold, and transmit an indication of the configuration to the first UE.

Another apparatus for wireless communications at a base station is described. The apparatus may include means for establishing a communication link with a first UE in communication with a second UE via a sidelink communications link, determining a configuration for candidate resource selection for a sidelink message from the first UE to the second UE, the configuration based on an initial power threshold and a stop power threshold, and transmitting an indication of the configuration to the first UE.

A non-transitory computer-readable medium storing code for wireless communications at a base station is described. The code may include instructions executable by a processor to establish a communication link with a first UE in communication with a second UE via a sidelink communications link, determine a configuration for candidate resource selection for a sidelink message from the first UE to the second UE, the configuration based on an initial power threshold and a stop power threshold, and transmit an indication of the configuration to the first UE.

In some examples of the method, apparatuses, and non-transitory computer-readable medium described herein, the configuration indicates a power threshold increase used for determination of a set of candidate resources for the sidelink message.

In some examples of the method, apparatuses, and non-transitory computer-readable medium described herein, the power threshold increase may be according to an absolute value, a factor of an incremental value, a number of retransmissions associated with the sidelink message, a priority of the sidelink message, a packet delay budget (PDB) associated with the sidelink message, a priority of scheduled transmission for the at least one neighboring UE, or any combination thereof.

Some examples of the method, apparatuses, and non-transitory computer-readable medium described herein may further include operations, features, means, or instructions for transmitting an indication of an exclusion range for determination of a set of candidate resources for the sidelink message, where the exclusion range specifies resources to be excluded from the set of candidate resources.

In some examples of the method, apparatuses, and non-transitory computer-readable medium described herein, the indication may be transmitted via a control channel message.

DETAILED DESCRIPTION

Figure 1:
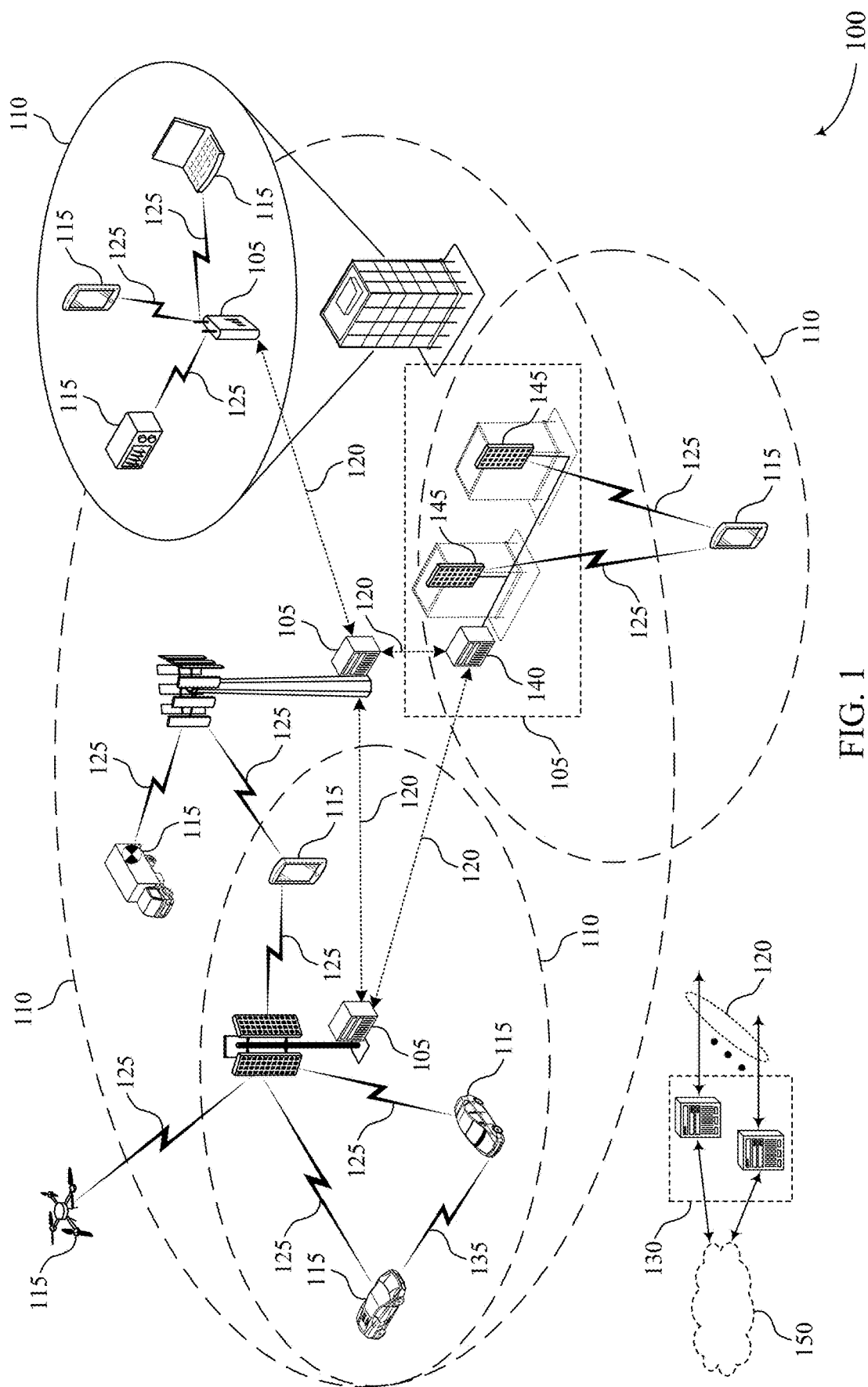
FIG. 1 illustrates an example of a wireless communications system that supports sidelink candidate resource selection in accordance with aspects of the present disclosure.

A wireless communications system may support both access links and sidelinks for communications between wireless devices. An access link may refer to a communication link between a user equipment (UE) and a base station (or relay device). For example, an access link may support uplink signaling, downlink signaling, connection procedures, etc. One or more UEs connected to a base station over access links may derive timing from the base station. A UE may also be an example of an integrated access and backhaul (IAB) node. A sidelink may refer to any communication link between similar wireless devices (e.g., a communication link between UEs, a backhaul communication link between base stations, etc.). While various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one wireless device to one or more other wireless devices.

As demand for sidelink communication increases (due to increased V2X demand for autonomous and semi-autonomous vehicles, D2D communication between Internet-of-Things (IoT) devices, factory automation, etc.), techniques to efficiently and reliably enhance throughput and reliability of sidelink channels are desirable. In some cases, coordination of resources used for sidelink and techniques to decrease the number of sidelink retransmissions and improve efficiency at transmitting and receiving UEs.

As more UEs perform sidelink communications, the availability of resources diminishes. Prior to scheduling a sidelink transmission (e.g., via sidelink control information (SCI)), a UE may search a time window for available resources. The time window may be defined by the processing time of the UE and the packet delay budget (PDB) of the sidelink message. The UE may determine available resources (i.e., candidate resources) based on a reference signal received power (RSRP) threshold and RSRP measurements of neighboring UEs. The RSRP threshold may be increased if not enough resources are available for sidelink transmissions within the time window.

If not enough resources are identified, the UE may increase the RSRP and search for resources again. If there is no limit on the RSRP threshold, the UE may continue to increase the RSRP threshold until enough resources are available, which may lead to collisions with other UEs. According to aspects herein, if enough resources are not available, the UE may only increase the RSRP until a stop RSRP limit is reached. The UE may increase the RSRP based on an absolute value or a factor of an incremental power value. Once the stop RSRP threshold is reached, the UE may modify the size of the time window, shift the time window, or reduce the number of retransmission of the sidelink message to search for resources for the sidelink message. In some cases, a base station may configure the UE with an exclusion range (i.e., resources to be excluded from consideration) or a configuration for increasing the RSRP threshold (e.g., a subset of values which the UE can use for incrementing the RSRP threshold).

Particular aspects of the subject matter described herein may be implemented to realize one or more advantages. The described techniques may support improvements in selecting resources for sidelink communications, reducing interference or collisions, and improving reliability, among other advantages. As such, supported techniques may include improved network operations and, in some examples, may promote network efficiencies, among other benefits.

Aspects of the disclosure are initially described in the context of wireless communications systems. A resource selection scheme and a process flow are then provided to illustrate aspects of the disclosure. Aspects of the disclosure are further illustrated by and described with reference to apparatus diagrams, system diagrams, and flowcharts that relate to sidelink candidate resource selection.

FIG. 1 illustrates an example of a wireless communications system 100 that supports sidelink candidate resource selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UE 115 may measure the RSRP of transmissions from other UEs 115 in a time window and exclude resources of transmissions associated with an RSRP measurement which is above an RSRP threshold. In some cases, not enough resources are identified, the UE 115 may increase the RSRP and search for resources again based on the increased RSRP threshold, however, the UE 115 may only increase the RSRP until a stop RSRP limit is reached. The UE 115 may increase the RSRP based on an absolute value or a factor of an incremental power value. Once the stop RSRP threshold is reached, the UE 115 may modify the size of the time window, shift the time window, or reduce the number of retransmission of the sidelink message to search for resources for transmitting the sidelink message. In some cases, a base station 105 may configure the UE 115 with an exclusion range (i.e., resources to be excluded from consideration) or a configuration for increasing the RSRP threshold (e.g., a subset of values which the UE can use for incrementing the RSRP threshold).

Figure 2:
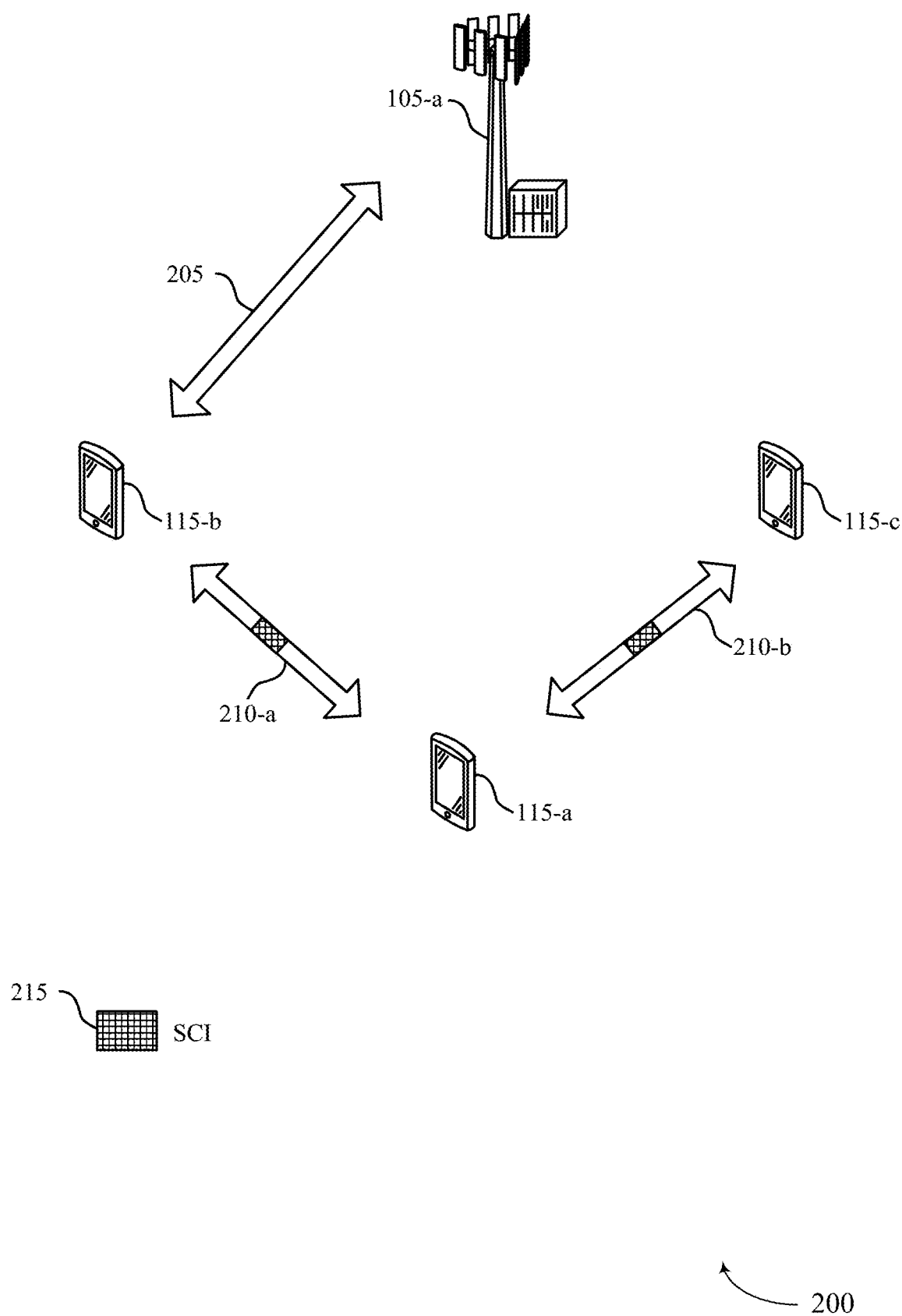
FIG. 2 illustrates an example of a wireless communications system that supports sidelink candidate resource selection in accordance with aspects of the present disclosure.

FIG. 2 illustrates an example of a wireless communications system 200 that supports sidelink candidate resource selection in accordance with aspects of the present disclosure. In some examples, wireless communications system 200 may implement aspects of wireless communications system 100. In some examples, the wireless communications system 200 may include a UE 115-*a*, a UE 115-*b*, a UE 115-*c*, and base station 105-*a* which may be examples of UEs 115 and base stations 105 described with reference to FIG. 1. One or more of the UEs 115 may communicate with the base station 105-*a* using a corresponding access link 205. In this example, the base station 105-*a* may communicate with UE 115-*b* via access link 205.

In this example, UE 115-*a*, UE 115-*b*, and UE 115-*c* may be supported by the base station 105-*a* or may be members of a sidelink communications group, in which members of the group may communicate with other members of the group to provide data or other information via sidelinks 210. In this example, UE 115-a may communicate with UE 115-*b* via sidelink 210-*a*, and UE 115-*a* may communicate with UE 115-*c* via sidelink 210-*b*. UE 115-*a*, UE 115-*b*, and UE 115-*c* may determine time-frequency resources (e.g., based on a decentralized channel access mechanism in which each UE 115 adjusts its rate of channel access based on data packet collisions) to communicate with each other via sidelinks 210. Before sending a transmission, UE 115-*a* may select a set of available resources for the transmission. UE 115-*a* may determine the available (e.g., candidate) resources by excluding the resources that are utilized by other UEs 115 (e.g., UE 115-*b* and UE 115-*c*). For instance, UE 115-*b* and UE 115-*c* may send an SCI 215 to UE 115-*a*. The SCI 215 may indicate allocated time-frequency resources (slots, mini slots, subframes, channels, subcarriers, subchannels, etc.) for ongoing transmissions or reservations of resources for future transmissions. UE 115-*a* may decode the SCI 215 to identify the reserved resources and exclude those reserved resources from the set of available resources for selection for sidelink communications. Additionally or alternatively, UE 115-*a* may determine to exclude resources based on location information of UE 115-*b* or UE 115-*c*, which may be included in control information (e.g., SCI) transmitted by UE 115-*b*, UE 115-*c*, base station 105-*a*, or other network device.

UE 115-*a* may identify candidate resources within a resource selection window and select resources for transmissions or retransmissions. In some examples, UE 115-*a* may determine which resources are reserved by measuring the signal strength (e.g., RSRP, RSRQ, etc.) of a reference signal from UE 115-*b* or UE 115-*c*. UE 115-*a* may measure the RSRP associated with an SCI 215 from UE 115-*b* and UE 115-*c* within a time window. A resource may be excluded as a candidate if the RSRP (e.g., layer 1 sidelink RSRP) measurement is above a RSRP threshold value. An RSRP measurement above the RSRP threshold value may indicate that the transmission is from a UE in close proximity. An RSRP measurement below the RSRP threshold value may indicate that the transmission is from a UE that is further away or that the resource is a candidate resource.

The RSRP threshold may be a function of the priority of the sidelink transmission indicated in the received SCI 215 and the priority of the transmission for which resources are being selected by UE 115-*a*. The initial RSRP threshold may be pre-configured for each combination of priority indication associated with the resource indicated in SCI 215 and priority of the transmission in the UE 115-*a* selecting resources.

In some examples, UE 115-*a* may increase the RSRP threshold (e.g., by a number of decibels (dBs)) until the ratio of identified candidate resources to the total number of resources in a resource selection window is greater than a determined percentage value (e.g., 10%, 20%, 30%). If the ratio is less than the determined percentage value, UE 115-*a* may increase the RSRP threshold by a number of dB (e.g., according to an absolute value, a factor, or percentage above the initial RSRP threshold) and repeat the candidate resources selection procedure. UE 115-*a* may repeat candidate resource selection procedure until a determined ratio of a number candidate resources to total resources is identified.

Depending on the size of the selection window, UE 115-*a* may increase the RSRP threshold to a value which causes transmission sent from UE 115-*a* to collide with transmissions from UE 115-*b* and UE 115-*c*. The collisions may occur due to UE 115-*a* using resources which are reserved by UE 115-*b* and UE 115-*c*, but the RSRP of these reserved resources is lower than the increased RSRP threshold. Thus, UE 115-*a* may identify these reserved resources as available which causes collisions and degrade performance. Techniques herein may limit UE 115-*a* increasing the RSRP threshold above a stop RSRP threshold during resource selection and may be based on a selection window length, priority of transmissions, or a PDB of the sidelink message to be scheduled for transmission by UE 115-*a*.

In accordance with aspects of the present disclosure, UE 115-*a* may determine a selection window length to determine candidate resources for transmissions. When measuring the RSRP associated with SCI 215 from UE 115-*b* and UE 115-c, the RSRP threshold may include a lower threshold (e.g., initial RSRP threshold) and an upper threshold (e.g., stop RSRP threshold). The stop RSRP threshold may be pre-configured in UE 115-a, UE 115-b and UE 115-c by the network (e.g., base station 105-a). Additionally or alternatively, base station 105-a may indicate, in control information, an exclusion range for the RSRP threshold, and UE 115-a, UE 115-b and UE 115-c may implement the exclusion range. While selecting candidate resources and excluding reserved resources, UE 115-a may start at the initial RSRP threshold and increase the RSRP threshold by a value or factor of Y dB (e.g., 3 dB, 2 dB, 5 dB) until the ratio of identified candidate resources to the total number of resources is reached (e.g., 20% of the total number of resources are free or candidate resources) or the stop RSRP threshold (e.g., 10 dB, 12 dB) is reached or exceeded.

In some cases, the stop RSRP threshold may be a function of the priority of a transmission, the PDB of the transmission, or the number of retransmissions. In a first example, if the transmission has a high priority, UE 115-a may increase the stop RSRP threshold to ensure the transmission is sent. In a second example, if the transmission has a high PDB, UE 115-a may lower the stop RSRP threshold due to the amount of time UE 115-a has to determine candidate resources for the transmission. In a third example, if there is high number of retransmissions, UE 115-a may decrease the stop RSRP threshold to ensure that a fraction of the retransmissions are successfully sent and avoid network congestion.

In some cases, the initial RSRP threshold and the stop RSRP threshold may be pre-configured in UE 115-a by the network and depend on the priority of the transmissions for UE 115-a, UE 115-b, and UE 115-c. Priority may include the priority of UE 115-a's own transmission for which resources are being selected and the priority of the received transmissions from UE 115-b and UE 115-c as indicated in the SCI 215 identifying the resources being reserved. In a first example, if UE 115-b has a higher priority transmission than UE 115-a, UE 115-b may transmit on the resources. In a second example, if UE 115-a has a higher priority transmission than UE 115-c, UE 115-a may select and transmit on the resources reserved by UE 115-c.

Figure 3:
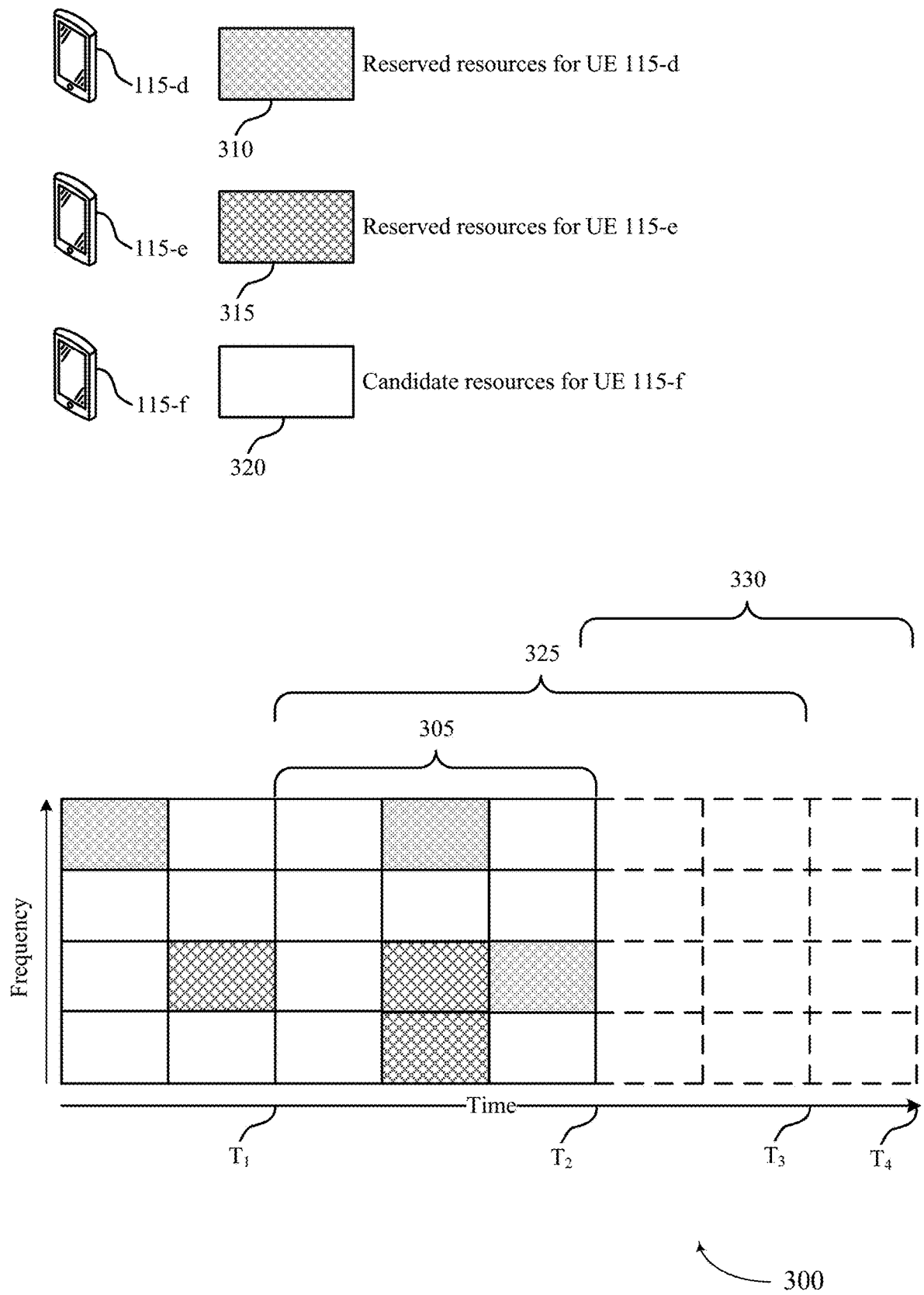
FIG. 3 illustrates an example of a resource selection scheme that supports sidelink candidate resource selection in accordance with aspects of the present disclosure.

FIG. 3 illustrates an example of a resource selection scheme 300 that supports sidelink candidate resource selection in accordance with aspects of the present disclosure. In some examples, the resource selection scheme 300 may include a UE 115-d, a UE 115-e, a UE 115-f, which may be examples of UEs 115 described with reference to FIGS. 1 and 2.

UE 115-f may identify candidate resources 320 within a resource selection window 305 and select resources for transmissions. In some examples, UE 115-f may determine which resources are reserved by UE 115-d (e.g., resources 310) and UE 115-e (e.g., resources 315) by measuring the RSRP associated with an SCI from UE 115-d or UE 115-e within a resource selection window 305. A resource may be excluded as a candidate if the RSRP measurement is above a RSRP threshold value.

UE 115-f may determine a window length to determine candidate resources for transmissions. The resource selection window 305 may begin at time $T_1$ (or $n+T_1$) and end at time $T_2$ (or $n+T_2$). The resource selection window 305 duration may be a function of the PDB or transmission priority. $T_1$ and $T_2$ may be UE implemented or pre-configured by the network. In some cases, UE 115-f may increase the RSRP threshold until it exceeds or reaches the stop RSRP threshold. UE 115-f may adjust (e.g., increase) the duration of the selection window 305 by increasing the ending time $T_2$ to time $T_3$ resulting in selection window 325. UE 115-f may determine candidate resources by measuring the RSRP of transmissions from UEs 115-d or 115-e within the selection window 325.

In some cases, UE 115-f may adjust the duration of selection window 305 by increasing the start time $T_1$ and end time $T_2$. Adjusting the start and end times of selection window 305 may slide the selection window so that it has a start time of $T_2$ (e.g., $n+T_2$) and an end time of $T_4$ (e.g., $n+2*T_2$), resulting in selection window 330.

UE 115-f may increase the RSRP threshold until the ratio of identified candidate resources to the total number of resources in resource selection window 305 is greater than a determined percentage value. In some cases, if the ratio of identified candidate resources to the total number of resources in resource selection window 305 is less than a determined percentage value, instead of increasing the RSRP threshold, UE 115-f may adjust the resource selection window (e.g., to duration of resources selection window 325 or 330) by adjusting the start and end times. After adjusting the resource selection window, UE 115-a may measure RSRP of transmissions and increase the RSRP threshold until the ratio of identified candidate resources to the total number of resources in the adjusted resource selection window is greater than a determined percentage value.

The duration of the resource selection window may be increased as a function of PDB or the number of retransmissions. For example, UE 115-f may reduce the number of retransmissions which will result in UE 115-f sending fewer transmissions in the selection window of the PDB. With fewer retransmissions, UE 115-f may identify candidate resources without colliding with other transmissions. Thus congestion control may be based on resource allocation.

Figure 4:
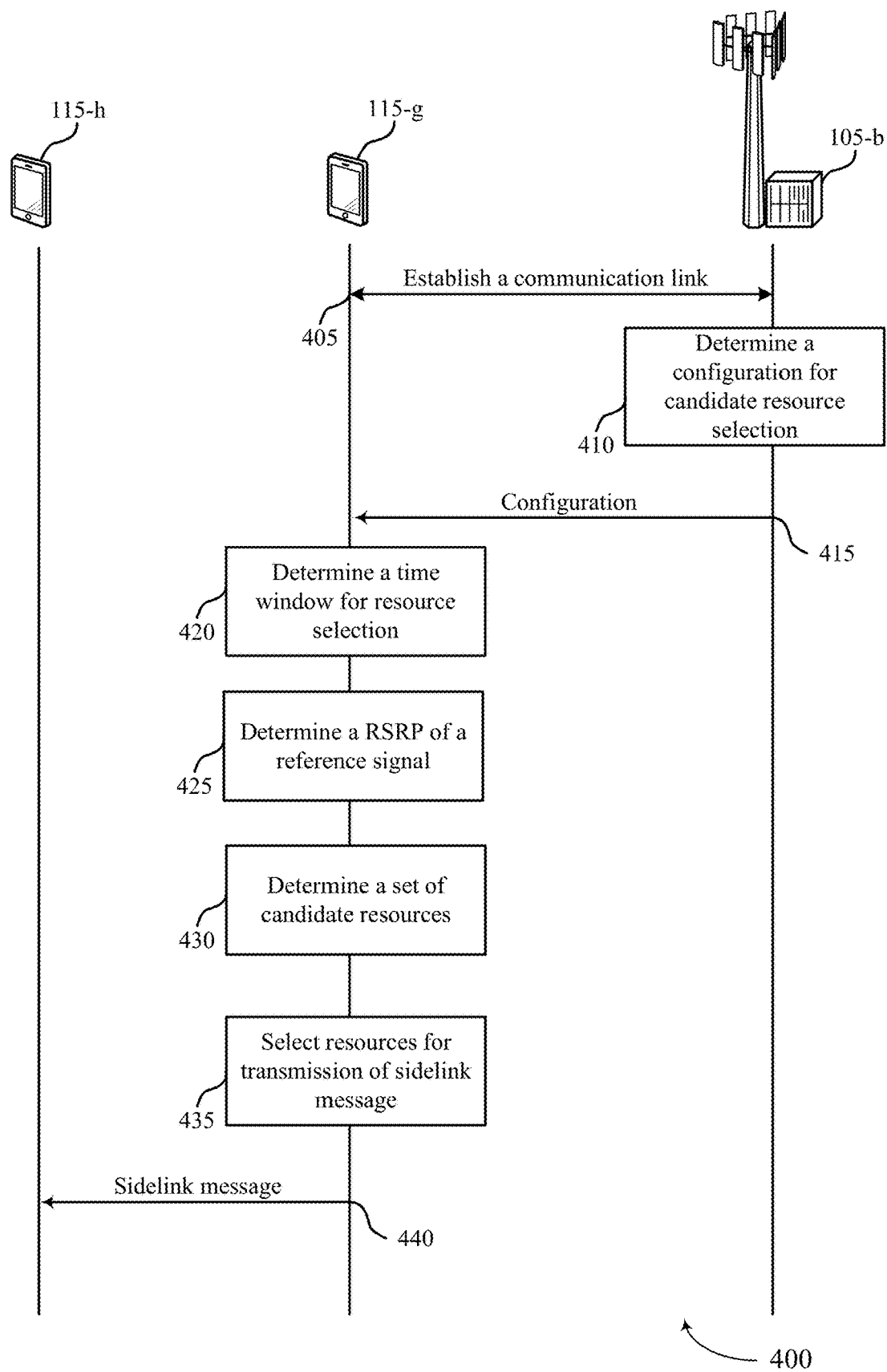
FIG. 4 illustrates an example of a process flow that supports sidelink candidate resource selection in accordance with aspects of the present disclosure.

FIG. 4 illustrates an example of a process flow 400 that supports sidelink candidate resource selection in accordance with aspects of the present disclosure. In some examples, process flow 400 may implement aspects of wireless communication system 100. In some examples, the process flow 400 may include a UE 115-g, a UE 115-h, and base station 105-b which may be examples of UEs 115 and base stations 105 described with reference to FIG. 1.

At 405, base station 105-b may establish a communication link (e.g., access link) with UE 115-g in communication with UE 115-h via a sidelink communications link.

At 410, base station 105-b may determine a configuration for candidate resource selection for a sidelink message from UE 115-g to UE 115-h, the configuration may be based on an initial power threshold (e.g., initial RSRP threshold) and a stop power threshold (e.g., stop RSRP threshold). In some examples, the configuration may indicate a power threshold increase used for determination of a set of candidate resources for the sidelink message. The power threshold increase may be according to an absolute value, a factor of an incremental value, a number of retransmissions associated with the sidelink message, a priority of the sidelink message, a PDB associated with the sidelink message, a priority of scheduled transmission for at least one neighboring UE (e.g., UE 115-h), or any combination thereof At 415, base station 105-b may transmit the configuration for candidate resource selection for a sidelink message to UE 115-g. In some examples, base station 105-b may transmit, via a control channel message to UE 115-g, an indication of an exclusion range for determination of the set of candidate resources for the sidelink message, where the exclusion range specifies resources to be excluded from the set of candidate resources.

At 420, UE 115-g may determine a time window for resource selection for transmission of a sidelink message from UE 115-g to UE 115-h. The time window may be based on a PDB of the sidelink message or a number of retransmissions associated with the sidelink message. In some examples, UE 115-g may increase a size of the time window for selection of resources for transmission of the sidelink message At 425, UE 115-g may determine an RSRP of a reference signal from the at least one neighboring UE (e.g., UE 115-h). UE 115-g may determine that the RSRP of the reference signal is above the initial power threshold and increase a power threshold for determining the set of candidate resources, the power threshold being between the initial power threshold and the stop power threshold. In some cases, UE 115-g may increase the power threshold according to an absolute value, a factor of an incremental value, a number of retransmissions associated with the sidelink message, a priority of the sidelink message, a PDB associated with the sidelink message, a priority of scheduled transmission for the at least one neighboring UE, or any combination thereof. Additionally or alternatively UE 115-g may refrain from increasing the power threshold past the stop power threshold.

In some cases, UE 115-g may determine that the RSRP of a reference signal from a neighboring UE is above the stop power threshold, where the size of the time window is increased based on the determination that the RSRP is above the stop power threshold. In other cases, UE 115-g may shift the time window from a first start time to a second start time subsequent to the first start time. UE 115-g may determine that the RSRP is above the stop power threshold, where the time window is shifted based at least in part on the determination that the RSRP is above the stop power threshold.

In some cases, UE 115-g may determine that a RSRP of a reference signal from the at least one neighboring UE is above the initial power threshold. UE 115-g may reduce the number of retransmissions associated with the sidelink message and increase the size of the time window based on reducing the number of retransmissions. UE 115-g may receive, from base station 105-b, a configuration for increasing a power threshold used for determination of the set of candidate resources and increase the power threshold.

At 430, UE 115-g may determine a set of candidate resources within the time window for transmission of the sidelink message. The set of candidate resources may correspond to a threshold percentage of total resources within the time window being available for resource selection based on an initial power threshold, a stop power threshold, and a power measurement associated with at least one neighboring UE. In some examples, UE 115-g may determine the set of candidate resources based on the increased size of the time window, shifting the time window, the configuration received from base station 105-b for increasing the power threshold, or the exclusion range, where the set of candidate resources excludes resources specified by the exclusion range. In other examples, UE 115-g may determine the set of candidate resources based on the RSRP, the initial power threshold, and the stop power threshold. UE 115-g may determine the set of resources after increasing the power threshold.

At 435, UE 115-g may select resources for transmission of the sidelink message from the set of candidate resources.

At 440, UE 115- may transmit the sidelink message to UE 115-h via the selected resources.

Figure 5:
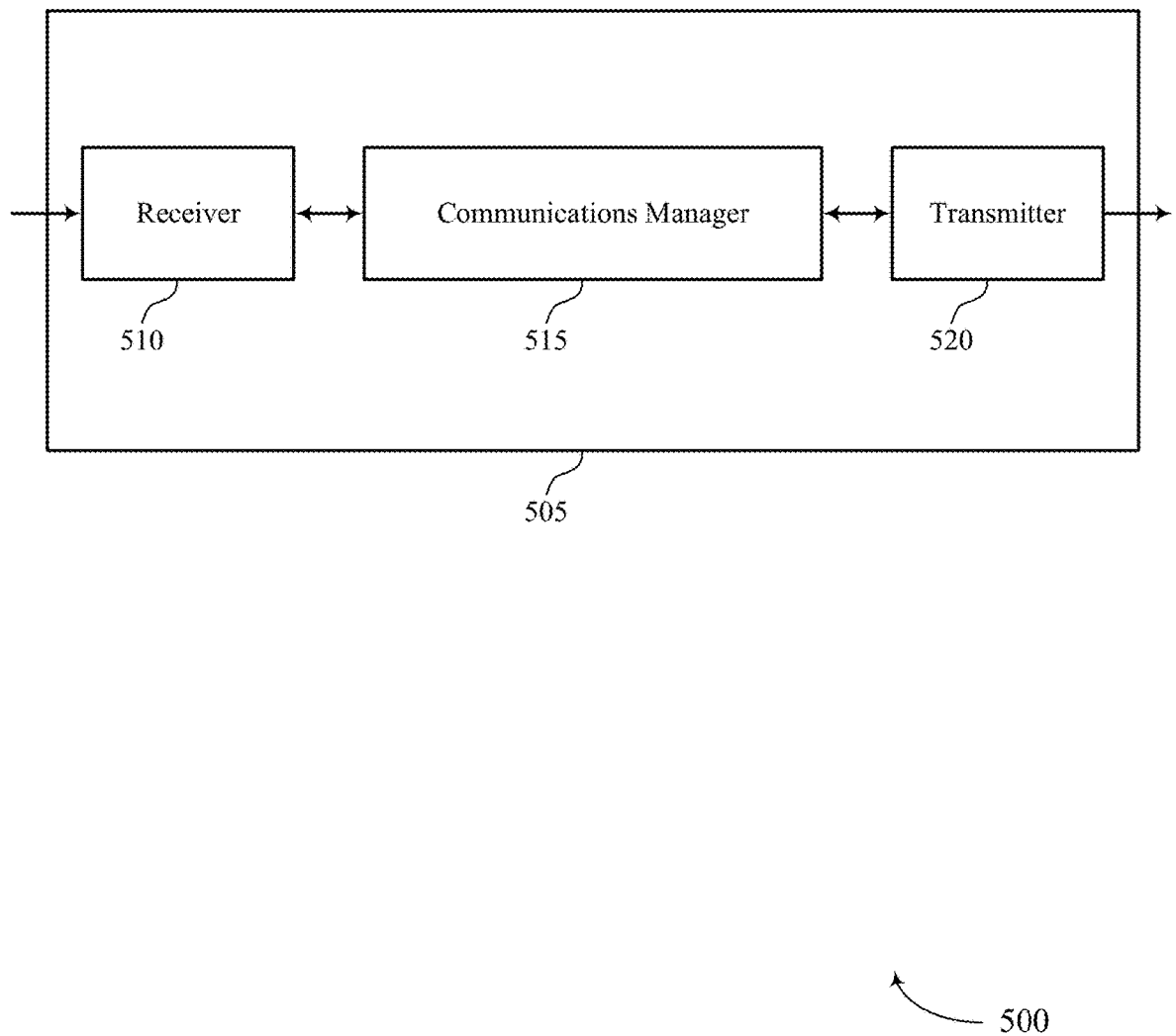
FIGS. 5 and 6 show block diagrams of devices that support sidelink candidate resource selection in accordance with aspects of the present disclosure.

FIG. 5 shows a block diagram 500 of a device 505 that supports sidelink candidate resource selection in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink candidate resource selection, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a time window for resource selection for transmission of a sidelink message from the first UE to a second UE, determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE, select resources for transmission of the sidelink message from the set of candidate resources, and transmit the sidelink message to the second UE via the selected resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to determine candidate resources for transmitting a sidelink message. Determining candidate resources before transmitting may increase reliability and reduce latency during sidelink transmissions.

Based on techniques for selecting candidate resources for sidelink communications as described herein, a processor of a UE 115 (e.g., controlling the receiver 510, the transmitter 520, or the transceiver 820 as described with reference to FIG. 8) may increase reliability, decrease collisions, and decrease signaling overhead in sidelink communications.

Figure 6:
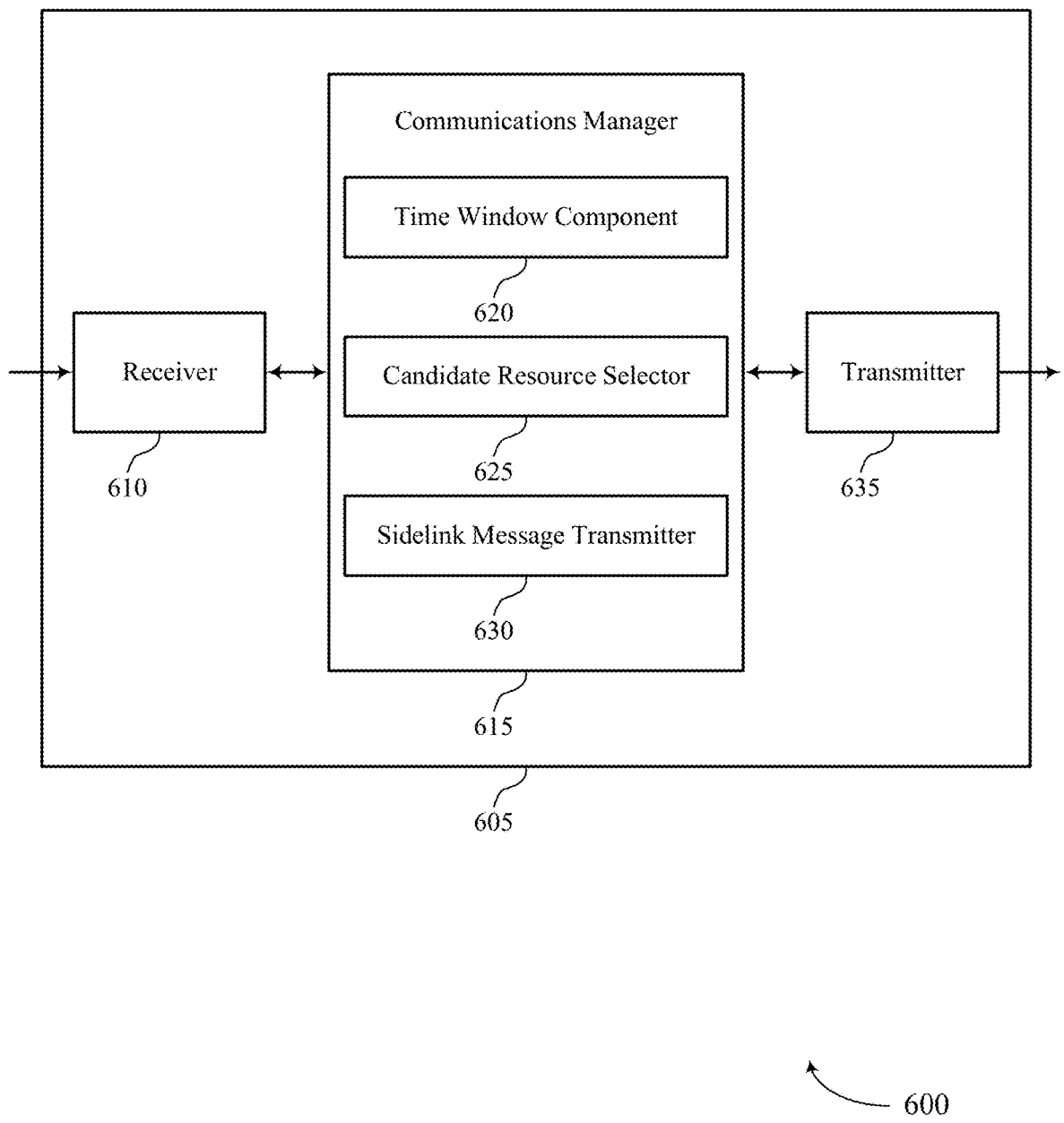

FIG. 6 shows a block diagram 600 of a device 605 that supports sidelink candidate resource selection in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to sidelink candidate resource selection, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a time window component 620, a candidate resource selector 625, and a sidelink message transmitter 630. The communications manager 615 may be an example of aspects of the communications manager 810 described herein.

The time window component 620 may determine a time window for resource selection for transmission of a sidelink message from the first UE to a second UE.

The candidate resource selector 625 may determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE and select resources for transmission of the sidelink message from the set of candidate resources.

The sidelink message transmitter 630 may transmit the sidelink message to the second UE via the selected resources.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some examples, the communications manager 615 may be implemented as an integrated circuit or chipset for a mobile device modem, and the receiver 610 and transmitter 635 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to determine candidate resources for transmitting a sidelink message. Determining candidate resources before transmitting may increase reliability and reduce latency during sidelink transmissions.

Based on techniques for selecting candidate resources for sidelink communications as described herein, a processor of a UE 115 (e.g., controlling the receiver 610, the transmitter 635, or the transceiver 820 as described with reference to FIG. 8) may increase reliability, decrease collisions, and decrease signaling overhead in sidelink communications.

Figure 7:
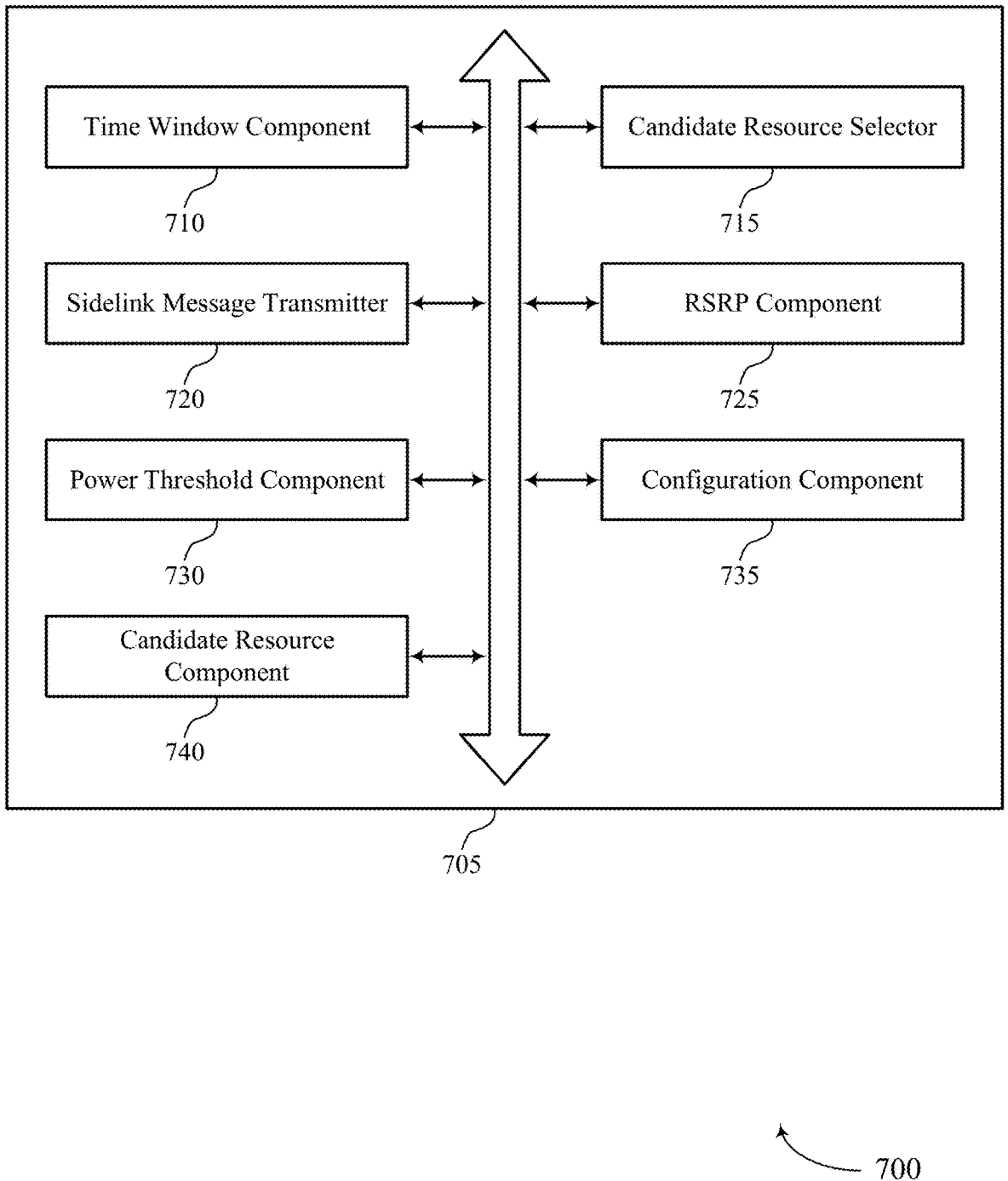
FIG. 7 shows a block diagram of a communications manager that supports sidelink candidate resource selection in accordance with aspects of the present disclosure.

FIG. 7 shows a block diagram 700 of a communications manager 705 that supports sidelink candidate resource selection in accordance with aspects of the present disclosure. The communications manager 705 may be an example of aspects of a communications manager 515, a communications manager 615, or a communications manager 810 described herein. The communications manager 705 may include a time window component 710, a candidate resource selector 715, a sidelink message transmitter 720, a RSRP component 725, a power threshold component 730, a configuration component 735, and a candidate resource component 740. Each of these modules may communicate, directly or indirectly, with one another (e.g., via one or more buses).

The time window component 710 may determine a time window for resource selection for transmission of a sidelink message from the first UE to a second UE.

In some examples, the time window component 710 may increase a size of the time window for selection of resources for transmission of the sidelink message.

In some examples, the time window component 710 may shift the time window from a first start time to a second start time subsequent the first start time.

In some examples, the time window component 710 may determine a number of retransmissions associated with the sidelink message.

In some examples, the time window component 710 may determine a size of the time window based on the number of retransmissions.

In some examples, the time window component 710 may increase the size of the time window based on reducing the number of retransmissions.

In some examples, the time window component 710 may determine the time window based on a packet delay budget of the sidelink message.

The candidate resource selector 715 may determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE.

In some examples, the candidate resource selector 715 may select resources for transmission of the sidelink message from the set of candidate resources.

In some examples, the candidate resource selector 715 may determine the set of candidate resources based on the RSRP, the initial power threshold, and the stop power threshold.

In some examples, the candidate resource selector 715 may determine the set of candidate resources based on the RSRP and the power threshold.

In some examples, the candidate resource selector 715 may determine the set of candidate resources based on the increased size of the time window.

In some examples, the candidate resource selector 715 may determine the set of candidate resources based on shifting the time window.

In some examples, the candidate resource selector 715 may receive an indication of an exclusion range for resource selection for transmission of the sidelink message.

In some examples, the candidate resource selector 715 may determine the set of candidate resources based on the exclusion range, where the set of candidate resources excludes resources specified by the exclusion range.

In some cases, the indication is received from a base station via a control channel message.

The sidelink message transmitter 720 may transmit the sidelink message to the second UE via the selected resources.

The RSRP component 725 may determine a reference signal received power (RSRP) of a reference signal from the at least one neighboring UE.

In some examples, the RSRP component 725 may determine that the RSRP of the reference signal is above the initial power threshold.

In some examples, the RSRP component 725 may determine that the RSRP is above the stop power threshold, where the size of the time window is increased based on the determination that the RSRP is above the stop power threshold.

In some examples, the RSRP component 725 may determine that the RSRP is above the stop power threshold, where the time window is shifted based on the determination that the RSRP is above the stop power threshold.

In some examples, the RSRP component 725 may determine that a reference signal received power (RSRP) of a reference signal from the at least one neighboring UE is above the initial power threshold.

The power threshold component 730 may increase a power threshold for determining the set of candidate resources, the power threshold being between the initial power threshold and the stop power threshold.

In some examples, the power threshold component 730 may increase the power threshold according to an absolute value, a factor of an incremental value, a number of retransmissions associated with the sidelink message, a priority of the sidelink message, a packet delay budget (PDB) associated with the sidelink message, a priority of scheduled transmission for the at least one neighboring UE, or any combination thereof.

In some examples, the power threshold component 730 may refrain from increasing the power threshold past the stop power threshold.

In some examples, the power threshold component 730 may receive a configuration for increasing a power threshold used for determination of the set of candidate resources.

In some examples, the power threshold component 730 may increase the power threshold used for determination of the set of candidate resources according to the configuration.

The configuration component 735 may reduce the number of retransmissions associated with the sidelink message.

In some cases, the configuration is received from a base station via a control channel message.

The candidate resource component 740 may determine the set of candidate resources from the time window based on the increased size.

In some examples, the candidate resource component 740 may determine the set of candidate resources based on the configuration.

In some examples, the candidate resource component 740 may determine the set of candidate resources after increasing the power threshold.

Figure 8:
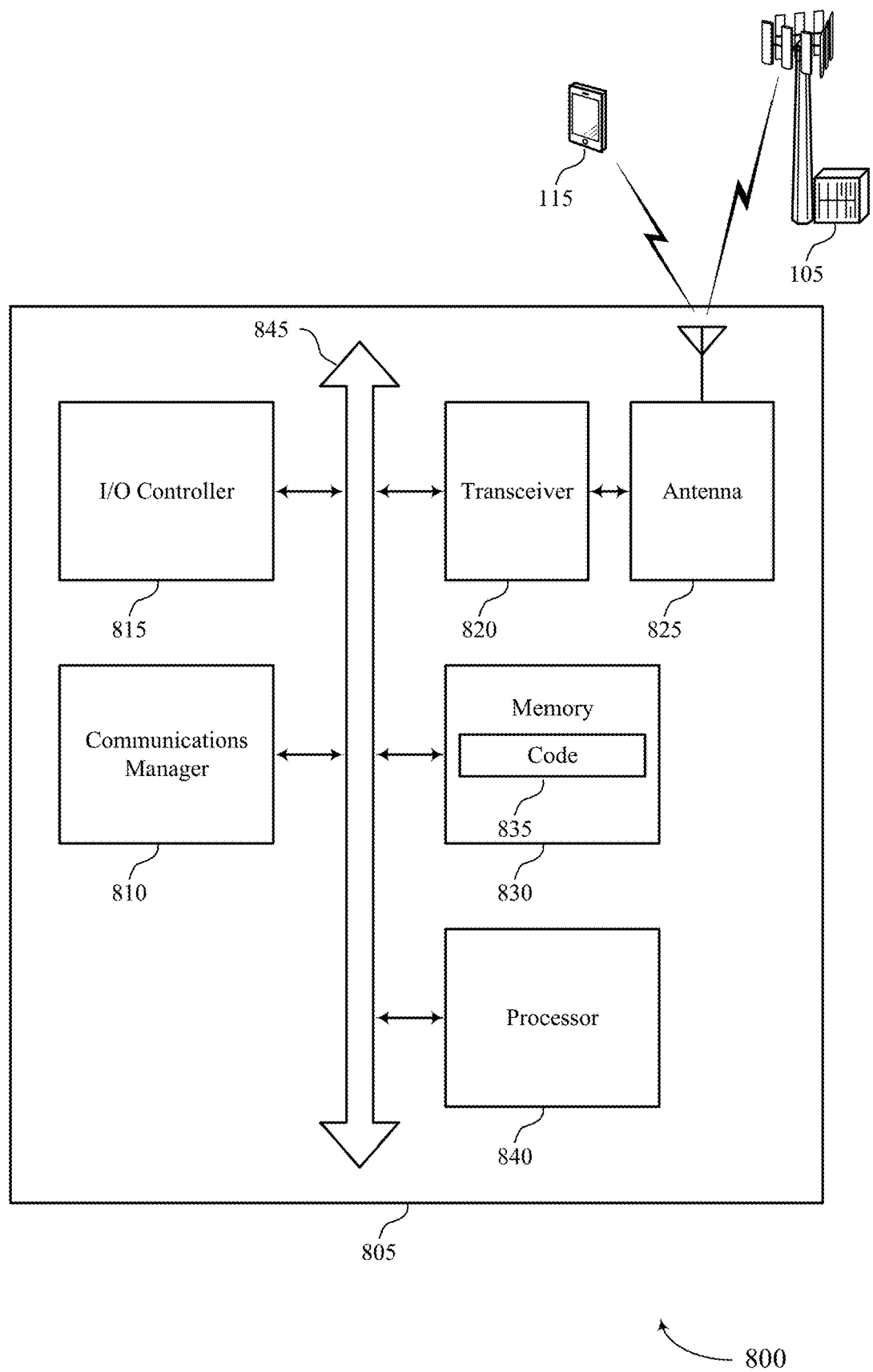
FIG. 8 shows a diagram of a system including a device that supports sidelink candidate resource selection in accordance with aspects of the present disclosure.

FIG. 8 shows a diagram of a system 800 including a device 805 that supports sidelink candidate resource selection in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine a time window for resource selection for transmission of a sidelink message from the first UE to a second UE, determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE, select resources for transmission of the sidelink message from the set of candidate resources, and transmit the sidelink message to the second UE via the selected resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink candidate resource selection).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
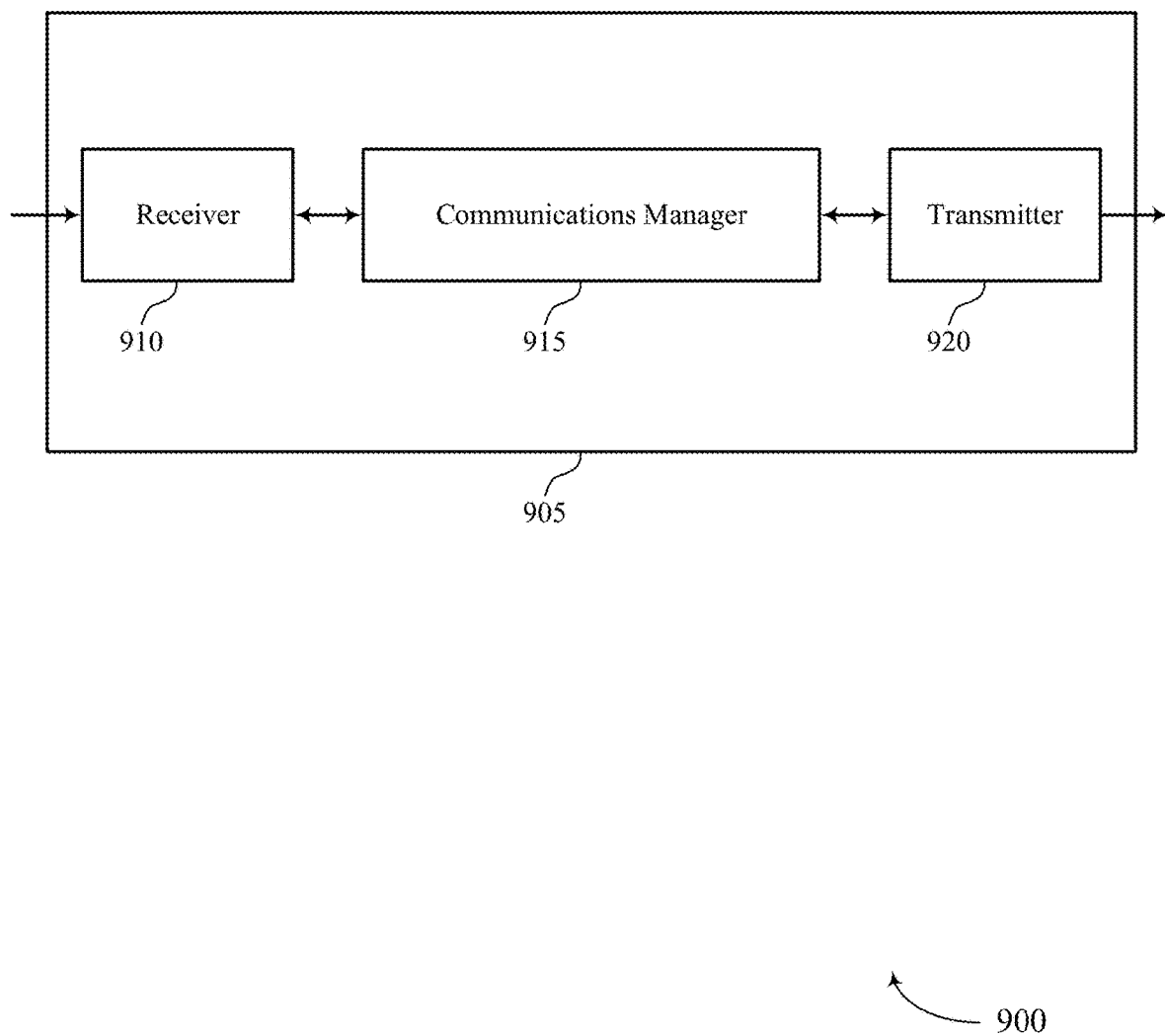
FIGS. 9 and 10 show block diagrams of devices that support sidelink candidate resource selection in accordance with aspects of the present disclosure.

FIG. 9 shows a block diagram 900 of a device 905 that supports sidelink candidate resource selection in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to sidelink candidate resource selection, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a communication link with a first UE in communication with a second UE via a sidelink communications link, transmit an indication of the configuration to the first UE, and determine a configuration for candidate resource selection for a sidelink message from the first UE to the second UE, the configuration based on an initial power threshold and a stop power threshold. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
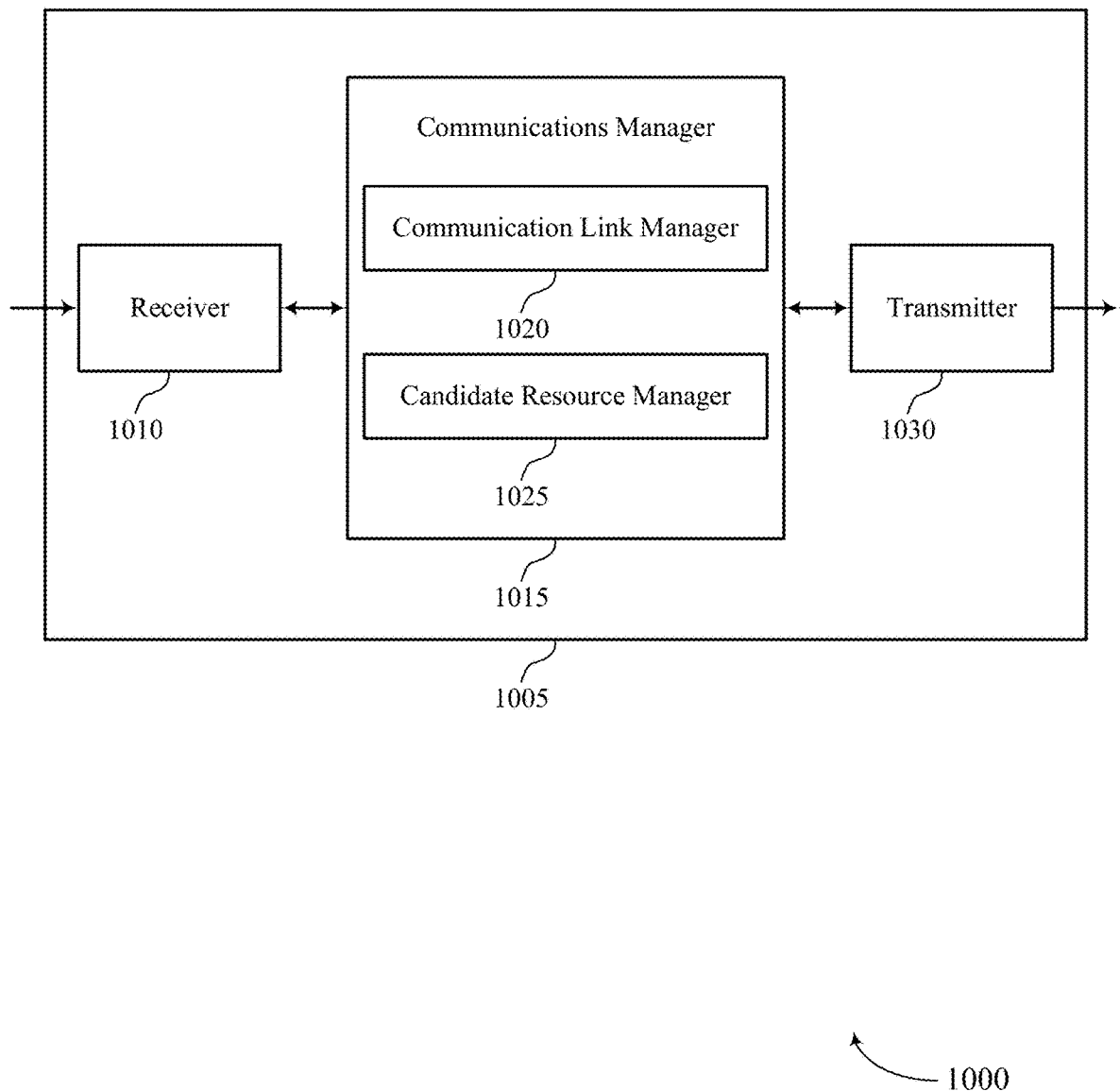

FIG. 10 shows a block diagram 1000 of a device 1005 that supports sidelink candidate resource selection in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink candidate resource selection, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communication link manager 1020 and a candidate resource manager 1025. The communications manager 1015 may be an example of aspects of the communications manager 1210 described herein.

The communication link manager 1020 may establish a communication link with a first UE in communication with a second UE via a sidelink communications link and transmit an indication of the configuration to the first UE.

The candidate resource manager 1025 may determine a configuration for candidate resource selection for a sidelink message from the first UE to the second UE, the configuration based on an initial power threshold and a stop power threshold.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
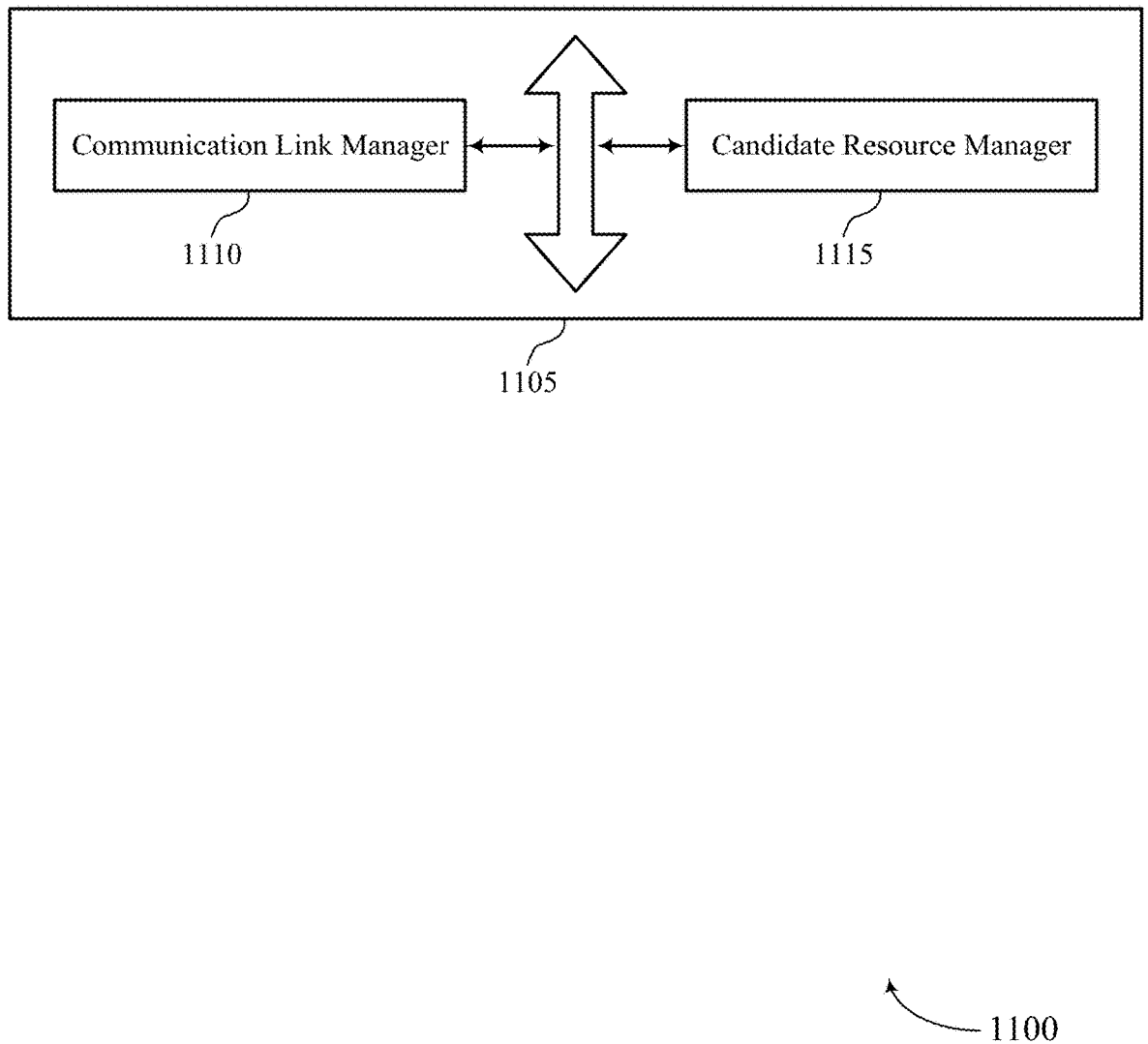
FIG. 11 shows a block diagram of a communications manager that supports sidelink candidate resource selection in accordance with aspects of the present disclosure.

FIG. 11 shows a block diagram 1100 of a communications manager 1105 that supports sidelink candidate resource selection in accordance with aspects of the present disclosure. The communications manager 1105 may be an example of aspects of a communications manager 915, a communications manager 1015, or a communications manager 1210 described herein. The communications manager 1105 may include a communication link manager 1110 and a candidate resource manager 1115. Each of these modules may communicate, directly or indirectly, with one another (e.g., via one or more buses).

The communication link manager 1110 may establish a communication link with a first UE in communication with a second UE via a sidelink communications link.

In some examples, the communication link manager 1110 may transmit an indication of the configuration to the first UE.

The candidate resource manager 1115 may determine a configuration for candidate resource selection for a sidelink message from the first UE to the second UE, the configuration based on an initial power threshold and a stop power threshold.

In some examples, the candidate resource manager 1115 may transmit an indication of an exclusion range for determination of a set of candidate resources for the sidelink message, where the exclusion range specifies resources to be excluded from the set of candidate resources.

In some cases, the configuration indicates a power threshold increase used for determination of a set of candidate resources for the sidelink message.

In some cases, the power threshold increase is according to an absolute value, a factor of an incremental value, a number of retransmissions associated with the sidelink message, a priority of the sidelink message, a packet delay budget (PDB) associated with the sidelink message, a priority of scheduled transmission for the at least one neighboring UE, or any combination thereof.

In some cases, the indication is transmitted via a control channel message.

Figure 12:
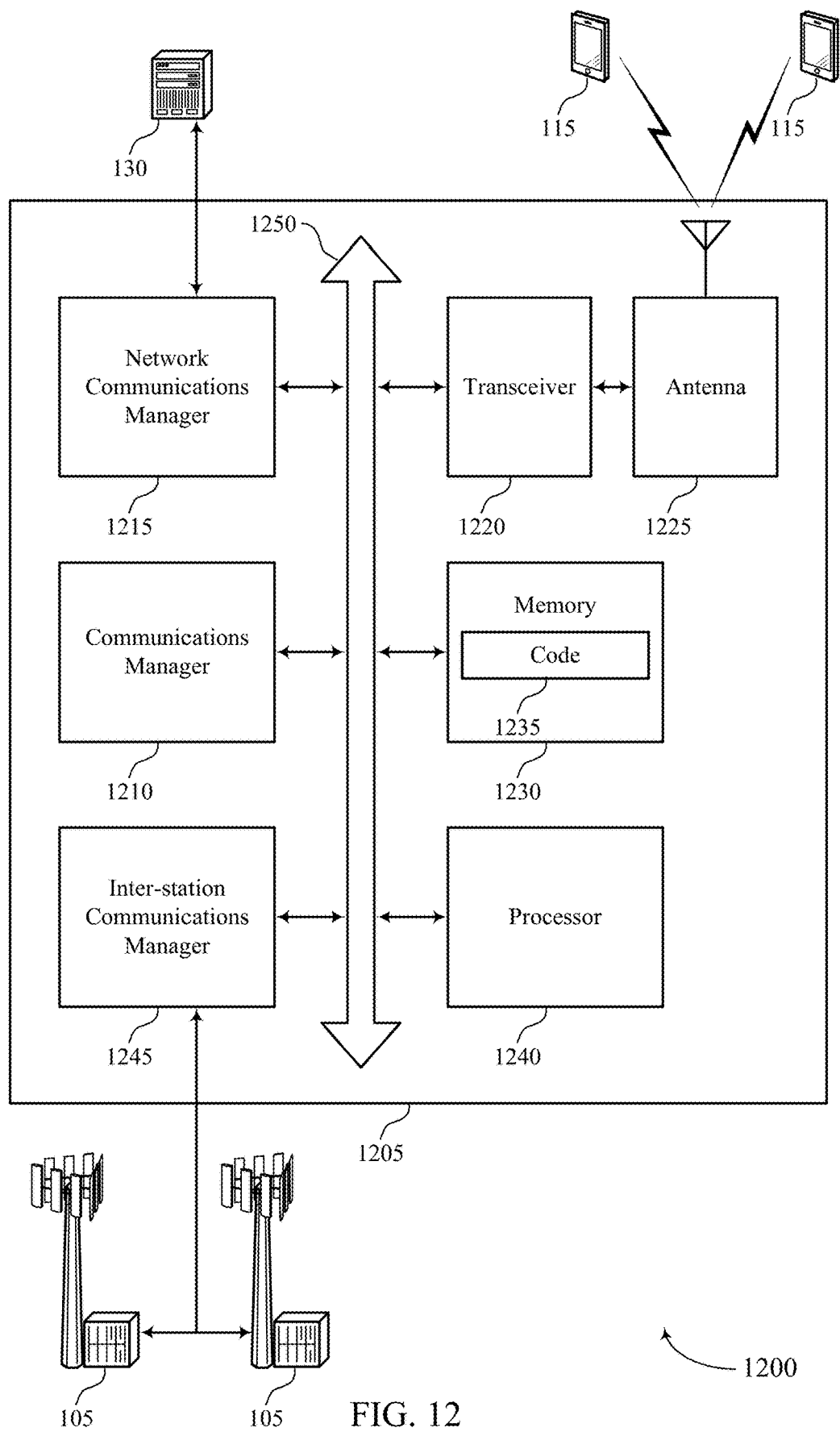
FIG. 12 shows a diagram of a system including a device that supports sidelink candidate resource selection in accordance with aspects of the present disclosure.

FIG. 12 shows a diagram of a system 1200 including a device 1205 that supports sidelink candidate resource selection in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a communication link with a first UE in communication with a second UE via a sidelink communications link, transmit an indication of the configuration to the first UE, and determine a configuration for candidate resource selection for a sidelink message from the first UE to the second UE, the configuration based on an initial power threshold and a stop power threshold.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting sidelink candidate resource selection).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
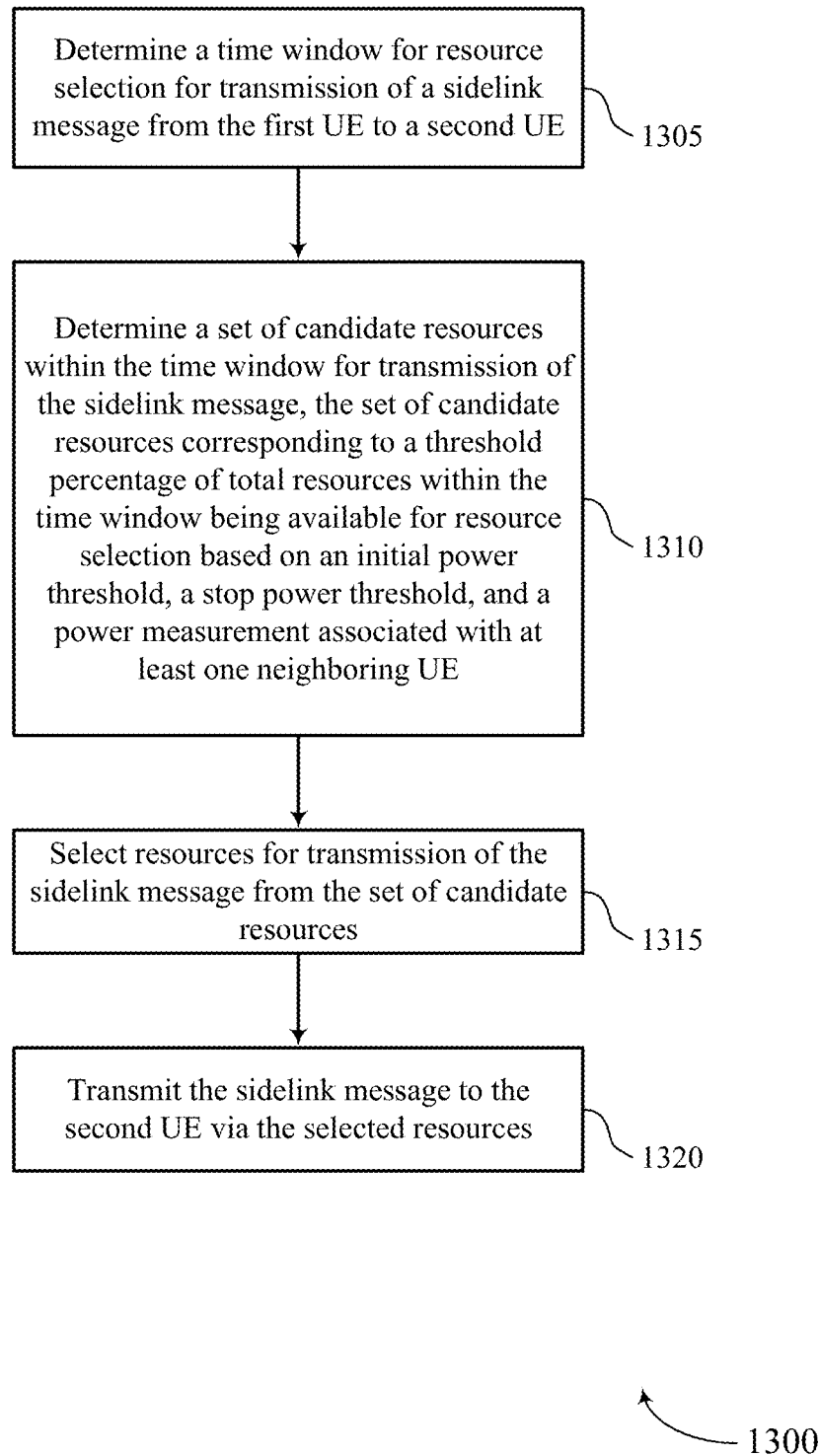
FIGS. 13 through 16 show flowcharts illustrating methods that support sidelink candidate resource selection in accordance with aspects of the present disclosure.

FIG. 13 shows a flowchart illustrating a method 1300 that supports sidelink candidate resource selection in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may determine a time window for resource selection for transmission of a sidelink message from the first UE to a second UE. The operations of 1305 may be performed according to the methods described herein. In some examples, aspects of the operations of 1305 may be performed by a time window component as described with reference to FIGS. 5 through 8.

At 1310, the UE may determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE. The operations of 1310 may be performed according to the methods described herein. In some examples, aspects of the operations of 1310 may be performed by a candidate resource selector as described with reference to FIGS. 5 through 8.

At 1315, the UE may select resources for transmission of the sidelink message from the set of candidate resources. The operations of 1315 may be performed according to the methods described herein. In some examples, aspects of the operations of 1315 may be performed by a candidate resource selector as described with reference to FIGS. 5 through 8.

At 1320, the UE may transmit the sidelink message to the second UE via the selected resources. The operations of 1320 may be performed according to the methods described herein. In some examples, aspects of the operations of 1320 may be performed by a sidelink message transmitter as described with reference to FIGS. 5 through 8.

Figure 14:
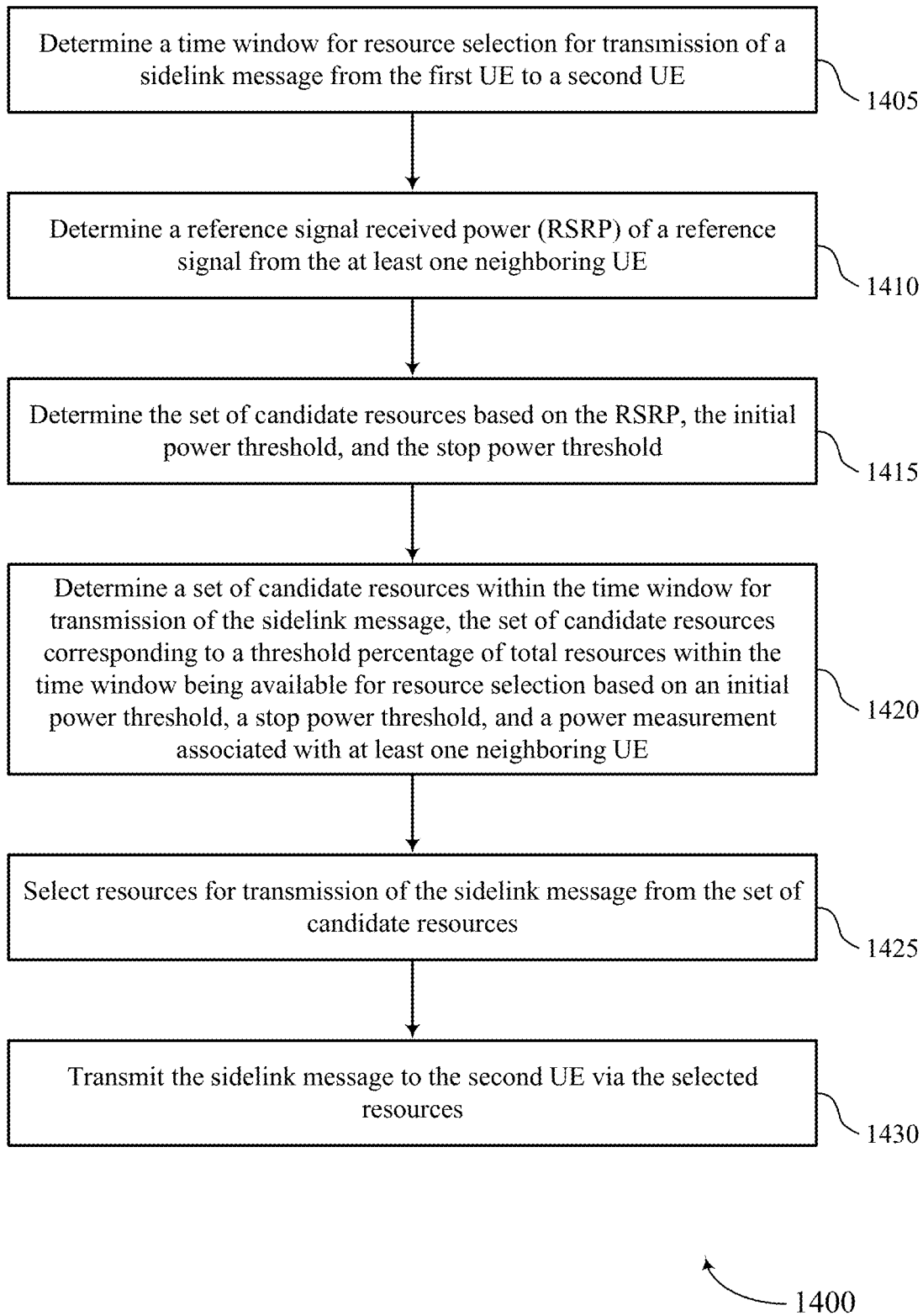

FIG. 14 shows a flowchart illustrating a method 1400 that supports sidelink candidate resource selection in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may determine a time window for resource selection for transmission of a sidelink message from the first UE to a second UE. The operations of 1405 may be performed according to the methods described herein. In some examples, aspects of the operations of 1405 may be performed by a time window component as described with reference to FIGS. 5 through 8.

At 1410, the UE may determine a reference signal received power (RSRP) of a reference signal from the at least one neighboring UE. The operations of 1410 may be performed according to the methods described herein. In some examples, aspects of the operations of 1410 may be performed by a RSRP component as described with reference to FIGS. 5 through 8.

At 1415, the UE may determine the set of candidate resources based on the RSRP, the initial power threshold, and the stop power threshold. The operations of 1415 may be performed according to the methods described herein. In some examples, aspects of the operations of 1415 may be performed by a candidate resource selector as described with reference to FIGS. 5 through 8.

At 1420, the UE may determine a set of candidate resources within the time window for transmission of the sidelink message, the set of candidate resources corresponding to a threshold percentage of total resources within the time window being available for resource selection based on an initial power threshold, a stop power threshold, and a power measurement associated with at least one neighboring UE. The operations of 1420 may be performed according to the methods described herein. In some examples, aspects of the operations of 1420 may be performed by a candidate resource selector as described with reference to FIGS. 5 through 8.

At 1425, the UE may select resources for transmission of the sidelink message from the set of candidate resources. The operations of 1425 may be performed according to the methods described herein. In some examples, aspects of the operations of 1425 may be performed by a candidate resource selector as described with reference to FIGS. 5 through 8.

At 1430, the UE may transmit the sidelink message to the second UE via the selected resources. The operations of 1430 may be performed according to the methods described herein. In some examples, aspects of the operations of 1430 may be performed by a sidelink message transmitter as described with reference to FIGS. 5 through 8.

Figure 15:
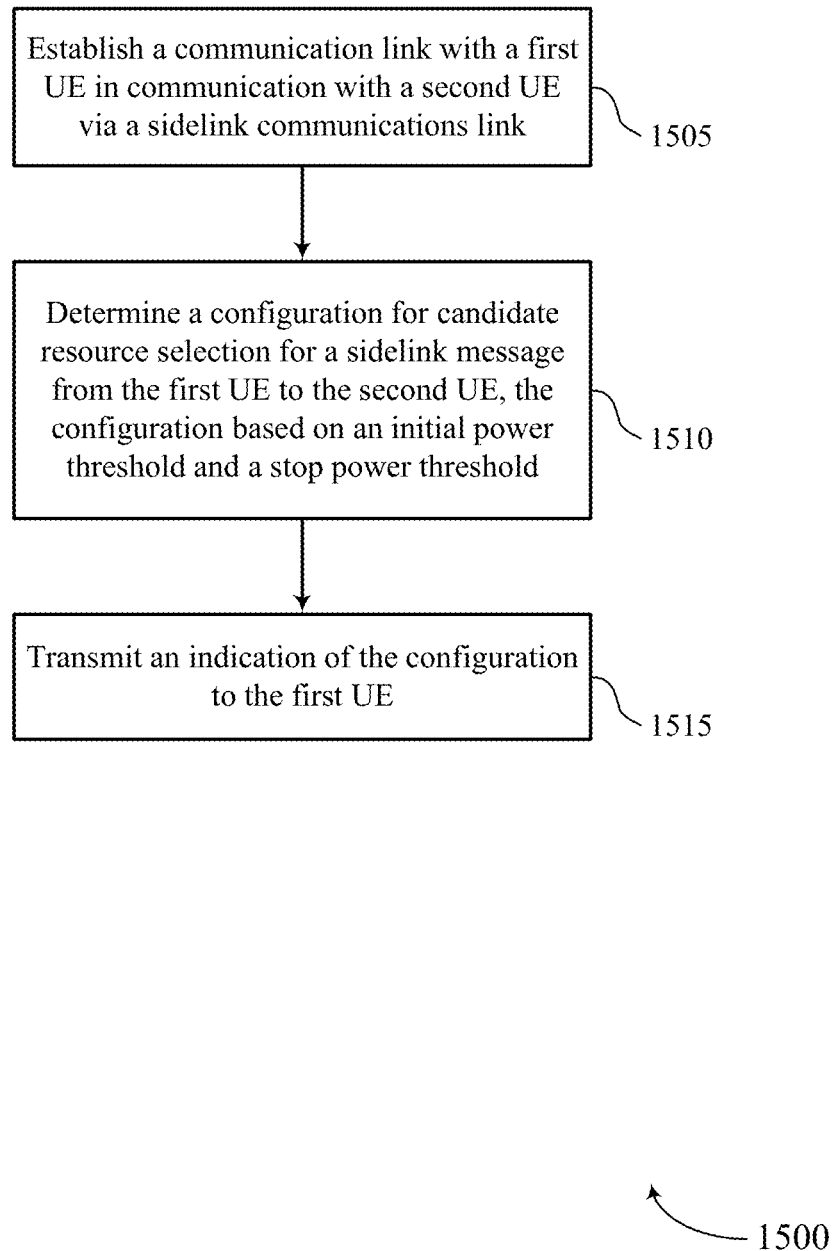

FIG. 15 shows a flowchart illustrating a method 1500 that supports sidelink candidate resource selection in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may establish a communication link with a first UE in communication with a second UE via a sidelink communications link. The operations of 1505 may be performed according to the methods described herein. In some examples, aspects of the operations of 1505 may be performed by a communication link manager as described with reference to FIGS. 9 through 12.

At 1510, the base station may determine a configuration for candidate resource selection for a sidelink message from the first UE to the second UE, the configuration based on an initial power threshold and a stop power threshold. The operations of 1510 may be performed according to the methods described herein. In some examples, aspects of the operations of 1510 may be performed by a candidate resource manager as described with reference to FIGS. 9 through 12.

At 1515, the base station may transmit an indication of the configuration to the first UE. The operations of 1515 may be performed according to the methods described herein. In some examples, aspects of the operations of 1515 may be performed by a communication link manager as described with reference to FIGS. 9 through 12.

Figure 16:
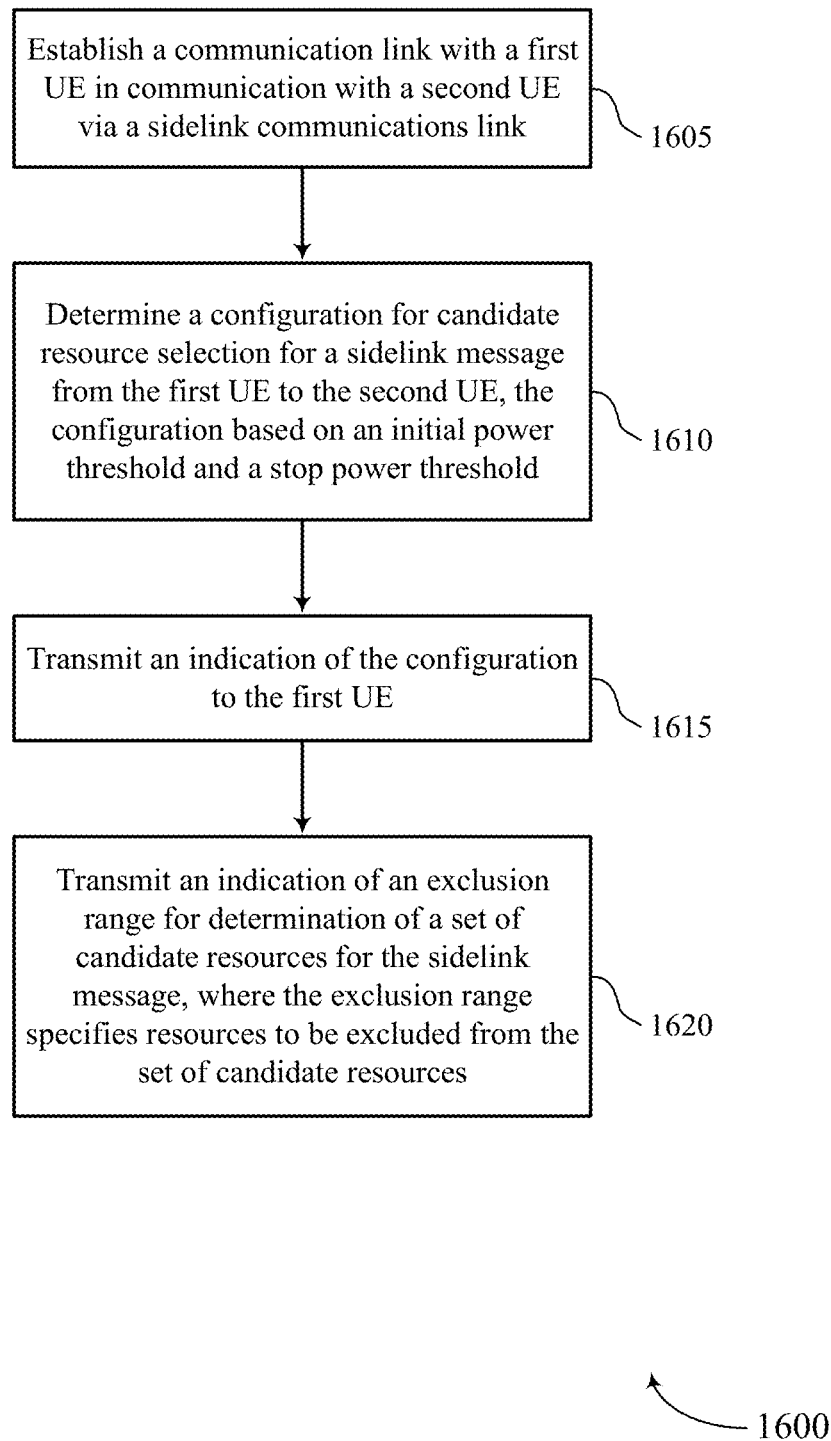

FIG. 16 shows a flowchart illustrating a method 1600 that supports sidelink candidate resource selection in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein.

Additionally or alternatively, a base station may perform aspects of the functions described herein using special-purpose hardware.

At 1605, the base station may establish a communication link with a first UE in communication with a second UE via a sidelink communications link. The operations of 1605 may be performed according to the methods described herein. In some examples, aspects of the operations of 1605 may be performed by a communication link manager as described with reference to FIGS. 9 through 12.

At 1610, the base station may determine a configuration for candidate resource selection for a sidelink message from the first UE to the second UE, the configuration based on an initial power threshold and a stop power threshold. The operations of 1610 may be performed according to the methods described herein. In some examples, aspects of the operations of 1610 may be performed by a candidate resource manager as described with reference to FIGS. 9 through 12.

At 1615, the base station may transmit an indication of the configuration to the first UE. The operations of 1615 may be performed according to the methods described herein. In some examples, aspects of the operations of 1615 may be performed by a communication link manager as described with reference to FIGS. 9 through 12.

At 1620, the base station may transmit an indication of an exclusion range for determination of a set of candidate resources for the sidelink message, where the exclusion range specifies resources to be excluded from the set of candidate resources. The operations of 1620 may be performed according to the methods described herein. In some examples, aspects of the operations of 1620 may be performed by a candidate resource manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: determining a time window for resource selection for transmission of a sidelink message from the first UE to a second UE; determining a set of candidate resources within the time window for transmission of the sidelink message, the set of candidate resources corresponding to a threshold percentage of total resources within the time window being available for resource selection based at least in part on an initial power threshold, a stop power threshold, and a power measurement associated with at least one neighboring UE; selecting resources for transmission of the sidelink message from the set of candidate resources; and transmitting the sidelink message to the second UE via the selected resources.

Aspect 2: The method of aspect 1, further comprising: determining a reference signal received power (RSRP) of a reference signal from the at least one neighboring UE; and determining the set of candidate resources based at least in part on the RSRP, the initial power threshold, and the stop power threshold.

Aspect 3: The method of aspect 2, further comprising: determining that the RSRP of the reference signal is above the initial power threshold; increasing a power threshold for determining the set of candidate resources, the power threshold being between the initial power threshold and the stop power threshold; and determining the set of candidate resources based at least in part on the RSRP and the power threshold.

Aspect 4: The method of aspect 3, further comprising: increasing the power threshold according to an absolute value, a factor of an incremental value, a number of retransmissions associated with the sidelink message, a priority of the sidelink message, a packet delay budget (PDB) associated with the sidelink message, a priority of scheduled transmission for the at least one neighboring UE, or any combination thereof.

Aspect 5: The method of any of aspects 3 through 4, further comprising: refraining from increasing the power threshold past the stop power threshold.

Aspect 6: The method of any of aspects 2 through 5, further comprising: increasing a size of the time window for selection of resources for transmission of the sidelink message; and determining the set of candidate resources based at least in part on the increased size of the time window.

Aspect 7: The method of aspect 6, further comprising: determining that the RSRP is above the stop power threshold, wherein the size of the time window is increased based at least in part on the determination that the RSRP is above the stop power threshold.

Aspect 8: The method of any of aspects 2 through 7, further comprising: shifting the time window from a first start time to a second start time subsequent the first start time; and determining the set of candidate resources based at least in part on shifting the time window.

Aspect 9: The method of aspect 8, further comprising: determining that the RSRP is above the stop power threshold, wherein the time window is shifted based at least in part on the determination that the RSRP is above the stop power threshold.

Aspect 10: The method of any of aspects 1 through 9, further comprising: receiving an indication of an exclusion range for resource selection for transmission of the sidelink message; and determining the set of candidate resources based at least in part on the exclusion range, wherein the set of candidate resources excludes resources specified by the exclusion range.

Aspect 11: The method of aspect 10, wherein the indication is received from a base station via a control channel message.

Aspect 12: The method of any of aspects 1 through 11, further comprising: determining a number of retransmissions associated with the sidelink message; and determining a size of the time window based at least in part on the number of retransmissions.

Aspect 13: The method of aspect 12, further comprising: determining that a reference signal received power (RSRP) of a reference signal from the at least one neighboring UE is above the initial power threshold; reducing the number of retransmissions associated with the sidelink message; increasing the size of the time window based at least in part on reducing the number of retransmissions; and determining the set of candidate resources from the time window based at least in part on the increased size.

Aspect 14: The method of any of aspects 1 through 13, further comprising: determining the time window based at least in part on a packet delay budget of the sidelink message.

Aspect 15: The method of any of aspects 1 through 14, further comprising: receiving a configuration for increasing a power threshold used for determination of the set of candidate resources; and determining the set of candidate resources based at least in part on the configuration.

Aspect 16: The method of aspect 15, wherein the configuration is received from a base station via a control channel message.

Aspect 17: The method of any of aspects 15 through 16, further comprising: determining that a reference signal received power (RSRP) of a reference signal from the at least one neighboring UE is above the initial power threshold; increasing the power threshold used for determination of the set of candidate resources according to the configuration; and determining the set of candidate resources after increasing the power threshold.

Aspect 18: A method for wireless communications at a base station, comprising: establishing a communication link with a first UE in communication with a second UE via a sidelink communications link; determining a configuration for candidate resource selection for a sidelink message from the first UE to the second UE, the configuration based at least in part on an initial power threshold and a stop power threshold; and transmitting an indication of the configuration to the first UE.

Aspect 19: The method of aspect 18, wherein the configuration indicates a power threshold increase used for determination of a set of candidate resources for the sidelink message.

Aspect 20: The method of aspect 19, wherein the power threshold increase is according to an absolute value, a factor of an incremental value, a number of retransmissions associated with the sidelink message, a priority of the sidelink message, a packet delay budget (PDB) associated with the sidelink message, a priority of scheduled transmission for the at least one neighboring UE, or any combination thereof.

Aspect 21: The method of any of aspects 18 through 20, further comprising: transmitting an indication of an exclusion range for determination of a set of candidate resources for the sidelink message, wherein the exclusion range specifies resources to be excluded from the set of candidate resources.

Aspect 22: The method of aspect 21, wherein the indication is transmitted via a control channel message.

Aspect 23: An apparatus for wireless communications at a first UE, comprising a processor; memory coupled with the processor; and instructions stored in the memory and executable by the processor to cause the apparatus to perform a method of any of aspects 1 through 17.

Aspect 24: An apparatus for wireless communications at a first UE, comprising at least one means for performing a method of any of aspects 1 through 17.

Aspect 25: A non-transitory computer-readable medium storing code for wireless communications at a first UE, the code comprising instructions executable by a processor to perform a method of any of aspects 1 through 17.

Aspect 26: An apparatus for wireless communications at a base station, comprising a processor; memory coupled with the processor; and instructions stored in the memory and executable by the processor to cause the apparatus to perform a method of any of aspects 18 through 22.

Aspect 27: An apparatus for wireless communications at a base station, comprising at least one means for performing a method of any of aspects 18 through 22.

Aspect 28: A non-transitory computer-readable medium storing code for wireless communications at a base station, the code comprising instructions executable by a processor to perform a method of any of aspects 18 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
    performing a power measurement associated with at least one neighboring UE during a time window for resource selection for transmission of a sidelink message from the first UE to a second UE;
    increasing a size of the time window for selection of resources for transmission of the sidelink message based at least in part on the power measurement associated with the neighboring UE exceeding a stop power threshold;
    selecting resources for transmission of the sidelink message from a set of candidate resources within the time window with the increased size for transmission of the sidelink message, the set of candidate resources corresponding to a threshold percentage of total resources within the time window with the increased size being available for resource selection based at least in part on an initial power threshold, the stop power threshold, the power measurement associated with the at least one neighboring UE, and the increased size of the time window;
    and
    transmitting the sidelink message to the second UE via the selected resources.

2. The method of claim 1, further comprising:
    determining a reference signal received power (RSRP) of a reference signal from the at least one neighboring UE; and
    determining the set of candidate resources based at least in part on the RSRP, the initial power threshold, and the stop power threshold.

3. The method of claim 2, further comprising:
    determining that the RSRP of the reference signal is above the initial power threshold;
    increasing a power threshold for determining the set of candidate resources, the power threshold being between the initial power threshold and the stop power threshold; and
    determining the set of candidate resources based at least in part on the RSRP and the power threshold.

4. The method of claim 3, further comprising:
    increasing the power threshold according to an absolute value, a factor of an incremental value, a quantity of retransmissions associated with the sidelink message, a priority of the sidelink message, a packet delay budget (PDB) associated with the sidelink message, a priority of scheduled transmission for the at least one neighboring UE, or any combination thereof.

5. The method of claim 3, further comprising:
    refraining from increasing the power threshold past the stop power threshold.

6. The method of claim 2, further comprising:
    determining that the RSRP is above the stop power threshold, wherein the size of the time window is increased based at least in part on the determination that the RSRP is above the stop power threshold.

7. The method of claim 2, further comprising:
    shifting the time window from a first start time to a second start time subsequent the first start time; and
    determining the set of candidate resources based at least in part on shifting the time window.

8. The method of claim 7, further comprising:
    determining that the RSRP is above the stop power threshold, wherein the time window is shifted based at least in part on the determination that the RSRP is above the stop power threshold.

9. The method of claim 1, further comprising:
    receiving an indication of an exclusion range for resource selection for transmission of the sidelink message; and
    determining the set of candidate resources based at least in part on the exclusion range, wherein the set of candidate resources excludes resources specified by the exclusion range.

10. The method of claim 9, wherein the indication is received from a network node via a control channel message.

11. The method of claim 1, further comprising:
    determining a quantity of retransmissions associated with the sidelink message; and determining a size of the time window based at least in part on the quantity of retransmissions.

12. The method of claim 11, further comprising:
determining that a reference signal received power (RSRP) of a reference signal from the at least one neighboring UE is above the initial power threshold;
reducing the quantity of retransmissions associated with the sidelink message;
increasing the size of the time window based at least in part on reducing the quantity of retransmissions; and
determining the set of candidate resources from the time window based at least in part on the increased size.

13. The method of claim 1, further comprising:
determining the time window based at least in part on a packet delay budget of the sidelink message.

14. The method of claim 1, further comprising:
receiving a configuration for increasing a power threshold used for determination of the set of candidate resources; and
determining the set of candidate resources based at least in part on the configuration.

15. The method of claim 14, wherein the configuration is received from a network node via a control channel message.

16. The method of claim 14, further comprising:
determining that a reference signal received power (RSRP) of a reference signal from the at least one neighboring UE is above the initial power threshold;
increasing the power threshold used for determination of the set of candidate resources according to the configuration; and
determining the set of candidate resources after increasing the power threshold.

17. A method for wireless communications at a network node, comprising:
establishing a communication link with a first user equipment (UE) in communication with a second UE via a sidelink communications link; and
transmitting, to the first UE, an indication of a configuration for candidate resource selection for a sidelink message from the first UE to the second UE, the configuration based at least in part on an initial power threshold and a stop power threshold, wherein the stop power threshold is associated with increasing a size of a time window for candidate resource selection for the sidelink message at the first UE based at least in part on a power measurement associated with the second UE exceeding the stop power threshold.

18. The method of claim 17, wherein the configuration indicates a power threshold increase used for determination of a set of candidate resources for the sidelink message.

19. The method of claim 18, wherein the power threshold increase is according to an absolute value, a factor of an incremental value, a quantity of retransmissions associated with the sidelink message, a priority of the sidelink message, a packet delay budget (PDB) associated with the sidelink message, a priority of scheduled transmission for at least one neighboring UE, or any combination thereof.

20. The method of claim 17, further comprising:
transmitting an indication of an exclusion range for determination of a set of candidate resources for the sidelink message, wherein the exclusion range specifies resources to be excluded from the set of candidate resources.

21. The method of claim 20, wherein the indication is transmitted via a control channel message.

22. An apparatus for wireless communications at a first user equipment (UE), comprising:
a processor,
memory coupled with the processor; and
instructions stored in the memory and executable by the processor to cause the apparatus to:
perform a power measurement associated with at least one neighboring UE during a time window for resource selection for transmission of a sidelink message from the first UE to a second UE;
increase a size of the time window for selection of resources for transmission of the sidelink message based at least in part on the power measurement associated with the neighboring UE exceeding a stop power threshold;
select resources for transmission of the sidelink message from a set of candidate resources within the time window with the increased size for transmission of the sidelink message, the set of candidate resources corresponding to a threshold percentage of total resources within the time window with the increased size being available for resource selection based at least in part on an initial power threshold, the stop power threshold, the power measurement associated with the at least one neighboring UE, and the increased size of the time window;
and
transmit the sidelink message to the second UE via the selected resources.

23. The apparatus of claim 22, wherein the instructions are further executable by the processor to cause the apparatus to:
determine a reference signal received power (RSRP) of a reference signal from the at least one neighboring UE; and
determine the set of candidate resources based at least in part on the RSRP, the initial power threshold, and the stop power threshold.

24. The apparatus of claim 23, wherein the instructions are further executable by the processor to cause the apparatus to:
determine that the RSRP of the reference signal is above the initial power threshold;
increase a power threshold for determining the set of candidate resources, the power threshold being between the initial power threshold and the stop power threshold; and
determine the set of candidate resources based at least in part on the RSRP and the power threshold.

25. The apparatus of claim 22, wherein the instructions are further executable by the processor to cause the apparatus to:
receive an indication of an exclusion range for resource selection for transmission of the sidelink message; and
determine the set of candidate resources based at least in part on the exclusion range, wherein the set of candidate resources excludes resources specified by the exclusion range.

26. An apparatus for wireless communications at a network node, comprising:
a processor,
memory coupled with the processor; and
instructions stored in the memory and executable by the processor to cause the apparatus to:
establish a communication link with a first user equipment (UE) in communication with a second UE via a sidelink communications link; and transmit, to the first UE, an indication of a configuration for candidate resource selection for a sidelink message from the first UE to the second UE, the configuration based at least in part on an initial power threshold and a stop power threshold, wherein the stop power threshold is associated with increasing a size of a time window for candidate resource selection for the sidelink message at the first UE based at least in part on a power measurement associated with the second UE exceeding the stop power threshold.

27. The apparatus of claim 26, wherein the configuration indicates a power threshold increase used for determination of a set of candidate resources for the sidelink message.

28. The apparatus of claim 27, wherein the power threshold increase is according to an absolute value, a factor of an incremental value, a quantity of retransmissions associated with the sidelink message, a priority of the sidelink message, a packet delay budget (PDB) associated with the sidelink message, a priority of scheduled transmission for at least one neighboring UE, or any combination thereof.

29. The apparatus of claim 26, wherein the instructions are further executable by the processor to cause the apparatus to:
transmit an indication of an exclusion range for determination of a set of candidate resources for the sidelink message, wherein the exclusion range specifies resources to be excluded from the set of candidate resources.

\* \* \* \* \*